United States Patent
Crawford

(10) Patent No.: US 6,717,770 B1
(45) Date of Patent: Apr. 6, 2004

(54) RECORDING HEAD FOR APPLYING A MAGNETIC FIELD PERPENDICULAR TO THE MAGNETIZATIONS WITHIN MAGNETIC STORAGE MEDIA

(75) Inventor: Thomas McLendon Crawford, Pittsburgh, PA (US)

(73) Assignee: Seagate Technology LLC, Scotts Valley, CA (US)

(*) Notice: Subject to any disclaimer, the term of this patent is extended or adjusted under 35 U.S.C. 154(b) by 469 days.

(21) Appl. No.: 09/815,488

(22) Filed: Mar. 23, 2001

Related U.S. Application Data
(60) Provisional application No. 60/191,989, filed on Mar. 24, 2000.

(51) Int. Cl.[7] .................................. G11B 5/127
(52) U.S. Cl. ........................................ 360/125
(58) Field of Search ........................... 360/125, 126, 360/119, 121, 317

(56) References Cited

U.S. PATENT DOCUMENTS

| | | |
|---|---|---|
| 3,683,407 A | 8/1972 | Paul et al. |
| 4,138,702 A | 2/1979 | Magnenet |

(List continued on next page.)

FOREIGN PATENT DOCUMENTS

| | | |
|---|---|---|
| EP | 0326904 A1 | 1/1989 |
| JP | 54128719 | 10/1979 |
| JP | 55055420 | 4/1980 |
| JP | 55080818 | 6/1980 |
| JP | 56087218 | 7/1981 |
| JP | 57033421 | 2/1982 |
| JP | 59195311 | 11/1984 |
| JP | 59231720 | 12/1984 |
| JP | 60059515 | 4/1985 |
| JP | 60124014 | 7/1985 |
| JP | 408045068 A | 2/1996 |

OTHER PUBLICATIONS

J. A. Katine et al., "Current–Driven Magnetization Reversal and Spin–Wave Excitations in Co/Cu/Co Pillars", *Physical Review Letters*, vol. 84, No. 14, Apr. 3, 2000, pp. 3149–3152.

C.H. Back, *Minimum Field Strength in Precessional Magnetization Reversal*, Science, (Aug. 6, 1999), vol. 285, pp. 864–867.

C.H. Back et al., *Magnetization Reversal in Ultrashort Magnetic Field Pulses*, Physical Review Letters, (Oct. 12, 1998), vol. 81, No. 15, pp. 3251–3254.

*Primary Examiner*—Allen Cao
(74) *Attorney, Agent, or Firm*—Alan G. Towner, Esq; Pietragallo, Bosick & Gordon

(57) ABSTRACT

A recording head for use with magnetic storage medium applies a magnetic field at a 90-degree angle to the orientation of the magnetizations within the individual domain of the storage medium. This magnetic field results in rotation of the magnetization to approximately 90-degrees from its initial and its final orientation. From this position, a second magnetic field is capable of orienting the magnetization in the desired direction to record the desired bit. A simplified manufacturing process, wherein both of the opposing write poles and their connecting yoke are formed as a single layer during a single deposition or plating process, may be used to manufacture such a recording head.

20 Claims, 20 Drawing Sheets

U.S. PATENT DOCUMENTS

| | | | |
|---|---|---|---|
| 4,253,127 A | 2/1981 | Kodama et al. |
| 4,277,809 A | 7/1981 | Fisher et al. |
| 4,410,603 A | 10/1983 | Yamamori et al. |
| 4,438,471 A | 3/1984 | Oshiki et al. |
| 4,541,026 A | 9/1985 | Bonin et al. |
| 4,546,398 A | 10/1985 | Toda et al. |
| 4,575,777 A | 3/1986 | Hosokawa |
| 4,613,918 A | 9/1986 | Kanai et al. |
| 4,629,660 A | 12/1986 | Sagoi et al. |
| 4,649,449 A | 3/1987 | Sawada et al. |
| 4,652,956 A | 3/1987 | Schewe |
| 4,731,157 A | 3/1988 | Lazzari |
| 4,737,873 A | 4/1988 | Desserre |
| 4,742,413 A | 5/1988 | Schewe |
| 4,751,598 A | 6/1988 | Hamilton |
| 4,763,215 A | 8/1988 | Gueugnon et al. |
| 4,771,350 A | 9/1988 | Desserre |
| 4,782,415 A | 11/1988 | Vinal |
| 4,897,749 A | 1/1990 | Perlov et al. |
| 4,943,882 A | 7/1990 | Wada et al. |
| 4,949,207 A | 8/1990 | Lazzari |
| 4,974,110 A | 11/1990 | Kanamine et al. |
| 4,982,301 A | 1/1991 | Endo |
| 5,003,423 A | 3/1991 | Imamura et al. |
| 5,041,932 A | 8/1991 | Hamilton |
| 5,057,957 A | 10/1991 | Ito et al. |
| 5,073,836 A | 12/1991 | Gill et al. |
| RE33,949 E | 6/1992 | Mallary et al. |
| 5,195,005 A | 3/1993 | Mallary et al. |
| 5,196,976 A | 3/1993 | Lazzari |
| 5,225,953 A | 7/1993 | Wada et al. |
| 5,247,413 A | 9/1993 | Shibata et al. |
| 5,274,521 A | 12/1993 | Miyauchi et al. |
| 5,311,386 A | 5/1994 | Mallary |
| 5,323,285 A | 6/1994 | Smith |
| 5,333,086 A | 7/1994 | Frey et al. |
| 5,396,391 A | 3/1995 | Tanaka et al. |
| 5,436,779 A | 7/1995 | Valstyn |
| 5,668,688 A | 9/1997 | Dykes et al. |
| 5,731,937 A | 3/1998 | Yuan |
| 5,738,927 A | 4/1998 | Nakamura et al. |
| 5,793,577 A | 8/1998 | Katz et al. |
| 5,815,909 A | 10/1998 | Gray |
| 5,870,260 A | 2/1999 | Davies et al. |
| 5,933,299 A | 8/1999 | Tanaka et al. |
| 5,942,342 A | 8/1999 | Hikosaka et al. |
| 6,008,969 A | 12/1999 | Imai et al. |
| 6,111,724 A * | 8/2000 | Santini ................... 360/126 |
| 6,118,625 A | 9/2000 | Heinz et al. |
| 6,134,089 A | 10/2000 | Barr et al. |
| 6,219,205 B1 | 4/2001 | Yuan et al. |
| 6,233,125 B1 | 5/2001 | Knapp et al. |
| 6,249,407 B1 | 6/2001 | Aoshima et al. |
| 6,259,583 B1 | 7/2001 | Fontana, Jr. et al. |
| 6,278,590 B1 | 8/2001 | Gill et al. |
| 6,395,413 B1 | 5/2002 | Ando |
| 6,456,448 B1 | 9/2002 | Akagi et al. |

* cited by examiner

RECORDING HEAD FOR APPLYING A MAGNETIC FIELD PERPENDICULAR TO THE MAGNETIZATIONS WITHIN MAGNETIC STORAGE MEDIA

CROSS REFERENCE TO RELATED APPLICATION

This application claims the benefit of U.S. Provisional Patent Application No. 60/191,989, filed Mar. 24, 2000.

BACKGROUND OF THE INVENTION

1. Field of the Invention

The present invention relates to recording heads for use with magnetic storage media. More specifically, the invention is a recording head applying a magnetic field at a 90-degree angle to the orientation of the magnetizations within the magnetic storage medium.

2. Description of the Related Art

Recording heads for use with a magnetic storage medium have typically been of the longitudinal type, utilizing a pair of opposing write poles with their tips in close proximity to each other at the bottom surface of the recording head. The two poles are connected typically at the top by a yoke, typically made of a ferromagnetic material similar to that used for the poles. A coil is located in close proximity to one of the two opposing poles. When current passes through the coil, magnetic flux is induced in the yoke which produces a magnetic field with a bubble-like contour, across a gap separating the two poles. A portion of the magnetic flux across the write gap will pass through the magnetic storage medium, thereby causing a change in the magnetic state within the magnetic storage medium where the head field is higher than the medium coercive force. The medium coercive force is chosen high enough so that only the head fields across a narrow gap of a thin film inductive head, flowing with a slider on a air bearing between the surfaces of the disk and the slider, modify the bits of information on the storage medium.

The bits of information are recorded on the disk along concentric tracks that are separated by guard bands. The width of the track plus that of the guard-band in which no information is stored defines the track density. The length of the bit along the track defines the linear density. The total storage capacity is directly proportional to the product of track density and linear density. The increase in linear density also enhances the data transfer rate. The demand for higher storage capacity and higher data rates led to the redesign of various components of disk drives.

The recording densities possible with longitudinal recording are limited to approximately 50 to 100 G bit/inch$^2$, because at higher recording densities, superparamagnetic effects result in magnetic instabilities within the magnetic storage medium.

Perpendicular recording has been proposed to overcome the recording density limitations of longitudinal recording. Perpendicular recording heads for use with magnetic storage medium typically include a pair of magnetically coupled poles, consisting of a main write pole having a small bottom surface area, and a flux return pole having a large bottom surface area. A coil is located adjacent to the main write pole, for inducing a magnetic field between that pole and a soft underlayer. The soft underlayer is located below the recording layer of the magnetic storage medium and enhances the amplitude of the field produced by the main pole. This in turn allows the use of medium with higher coercive force, consequently, more stable bits can be stored in the medium. In the recording process, an electrical current in the coil energizes the main pole, which produces a magnetic field. The image of this field is produced in the soft underlayer, such that about double the field strength is produced in the magnetic medium. The flux density that diverges from the tip into the soft underlayer returns to the main pole through the return flux pole. The return pole is located sufficiently far apart from the main pole, such that the soft material of the return pole does not affect the magnetic flux of the main pole, which is directed vertically into the hard layer and soft underlayer. Strong magnetic recording fields permit the use of high anisotropy magnetic recording medium. Therefore, significantly higher recording densities may be used before magnetic instabilities become an issue.

Regardless of whether longitudinal or perpendicular recording is used, conventional magnetic recording applies the magnetic write fields antiparallel to the direction of magnetization within a domain of the storage medium in order to write a bit. When writing to the storage medium at high speed, there is less time for thermal fluctuations to assist in switching. Therefore, increasing the speed of a write operation requires overcoming a higher thermal barrier. Overcoming the resulting media coercivity requires write poles having increasingly high saturation magnetic fields. Additionally, presently available write poles are fabricated by depositing multiple layers of material from the front of the recording head, working towards the back. Such designs utilize materials having different magnetic properties for different portions of the write apparatus (first pole, connecting yoke, and second pole), and different dimensions for each structure. The width of these structures is controlled by the spinning of photoresist across the surface upon which these structures are deposited, thereby limiting the extent to which the width can be narrowed based on the accuracy with which the photoresist can be deposited. The resulting structure is one which tends to become saturated by magnetic fields at the pole tips.

Accordingly, there is a need for a recording head capable of applying magnetic fields to the storage medium in a manner to better overcome the coercivity of the storage medium material. Additionally, there is a need for a recording head having a write apparatus that is easier to manufacture, for use with narrow trackwidths and high linear densities.

SUMMARY OF THE INVENTION

The present invention is a recording head for use with magnetic storage media, wherein the opposing poles of the recording head apply a magnetic field across the trackwidth of the magnetic storage medium, at a 90-degree angle to both the initial and final orientation of the individual magnetizations within the storage medium. The recording head may be used for either perpendicular or longitudinal recording.

The recording head includes a pair of opposing write poles, magnetically coupled by a yoke across their top portions. The distance between the two pole tips corresponds to the trackwidth. The two opposing write poles and connecting yoke may be formed from a single layer of material, having a thickness selected to accommodate the speed at which the magnetic storage medium passes the recording head and the desired linear density.

A coil passes between the opposing write poles. This coil may be any conventional coil dimensioned and configured to induce a magnetic field held within the write poles, connecting yoke, and write gap. Examples include a simple copper or gold coil, a waveguide microstrip, or an asymmetric co-planar strip (CPS).

A second coil is located adjacent to the write poles, and is dimensioned and configured to induce a magnetic field within the storage medium. This second coil may be any coil that is conventionally used, for example, a standard copper or gold coil, a waveguide microstrip, or asymmetric CPS.

A typical magnetic storage medium, such as the disk for a computer hard drive, includes a recording layer having a plurality of magnetically permeable tracks separated by guard bands. As is well known in the art, other layers may be present, for example, the soft underlayer typically used for perpendicular recording, and/or a substrate layer.

To use the recording head, the recording head (or slider) is separated from the magnetic storage medium by a distance known as the flying height. The magnetic storage medium is moved past the recording head so that the recording head follows the tracks of the magnetic storage medium. Current is passed through the coil corresponding to the opposing poles, thereby creating a magnetic flux within these poles. The resulting magnetic field is applied parallel to the trackwidth, corresponding to the hard axis of the track. Each track of the magnetic storage medium will have a hard axis parallel to the trackwidth, and an easy axis parallel to the desired orientation of the magnetizations within each domain. For example, the easy axis for a storage medium used for a longitudinal recording will be parallel to the track (down the track). The easy axis for a perpendicular recording will be perpendicular to both the trackwidth and the path of the track. The magnetic field applied along the hard axis causes the magnetization within the domain currently being acted upon to rotate from its present orientation to an orientation parallel with the trackwidth, along the hard axis. Upon removal of this magnetic field from the domain in question, this magnetization will rotate back so that it is oriented along the easy axis, either parallel or antiparallel to its original orientation. The second coil applies a magnetic field to the domain to ensure that, as it rotates back to the easy axis, it rotates in a desired direction. Current will be passed through this coil in the proper direction so that the appropriate magnetic field is applied for this purpose, according to the well-known right hand rule.

It is therefore an aspect of the present invention to provide a recording head for use with magnetic storage media, applying the magnetic write field perpendicular to the direction of media magnetization, thereby applying maximum magnetic torque to the magnetic domains within the storage medium.

It is another aspect of the present invention to provide a recording head for use with magnetic storage media permitting higher data transfer rates than presently available recording heads.

It is a further aspect of the present invention to provide a recording head for use with magnetic storage media, wherein the opposing write poles of the recording head and their connecting yoke are fabricated from a single deposited or plated layer of material.

It is another aspect of the present invention to provide a recording head for use with magnetic storage media, wherein the opposing write poles may be made quite wide, thereby providing a sufficiently wide path for a strong magnetic field, without adversely affecting trackwidth or recording density.

It is a further aspect of the present invention to provide a recording head for use with magnetic storage media that may be used for either perpendicular or longitudinal recording.

It is another aspect of the present invention to provide a recording head for use with magnetic storage media including means for producing a setting magnetic field for ensuring proper orientation of the magnetizations within the various domains of the magnetic storage media.

These and other aspects of the invention will become apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

The present invention is a recording head for use with magnetic storage media, having a pair of write poles dimensioned and configured to apply a magnetic write field perpendicular to the orientation of the magnetizations within the magnetic storage medium. A recording head of the present invention may be used for either longitudinal or perpendicular recording. As used herein, longitudinal recording means orienting the magnetic domains within the magnetic storage medium substantially parallel to the tracks, described in greater detail below. Perpendicular recording means orienting the magnetic domains within the magnetic storage medium substantially perpendicular to the storage medium. A recording head as used here and is defined as a head or slider capable of performing read/or write operations, although the present invention is directed primarily towards the write portion of the recording head.

Figure 1:
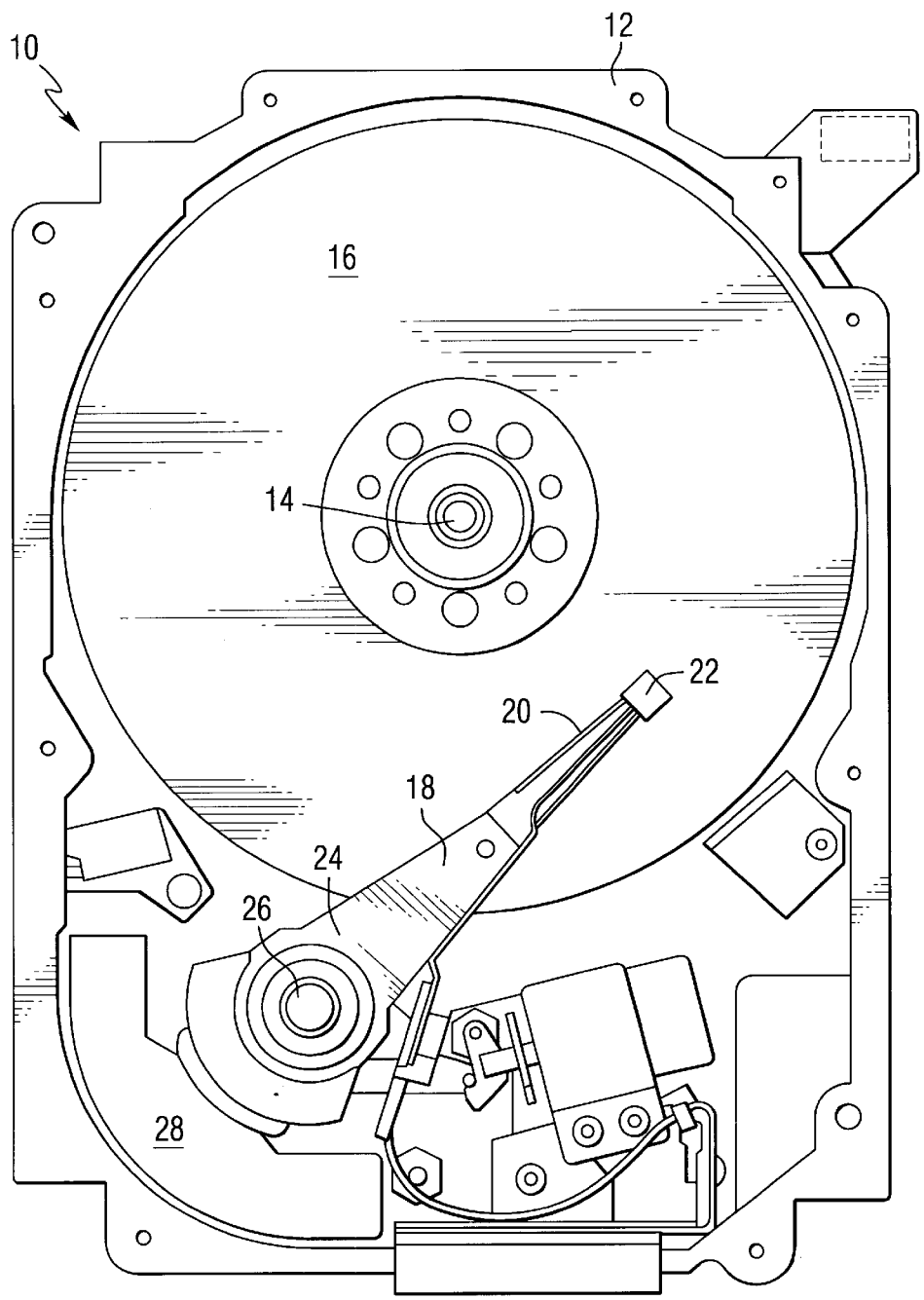
FIG. 1 is a top view of a typical hard disk drive for a computer for which the present invention may be used, illustrating the disk drive with its upper housing portion removed.

The invention will most commonly be used within a fixed disc drive 10 for computers, one of which is illustrated in FIG. 1. The fixed disc drive 10 includes a housing 12 (with the upper portion removed and the lower portion visible in this view for maximum clarity) dimensioned and configured to contain and locate the various components of the disc drive 10. The disc drive 10 includes a spindle motor 14 for rotating at least one magnetic storage medium 16 within the housing, in this case a magnetic disc. At least one arm 18 is contained within the housing 12, with each arm 18 having a first end 20 with a recording head or slider 22, and a second end 24 pivotally mounted to a bearing 26. An actuator motor 28, such as a movable coil DC motor, is located at the arm's second end 24, pivoting the arm 18 to position the head 22 over a desired sector of the disc 16. The actuator motor 28 is regulated by controller which is not shown and which is well known.

Figure 2:
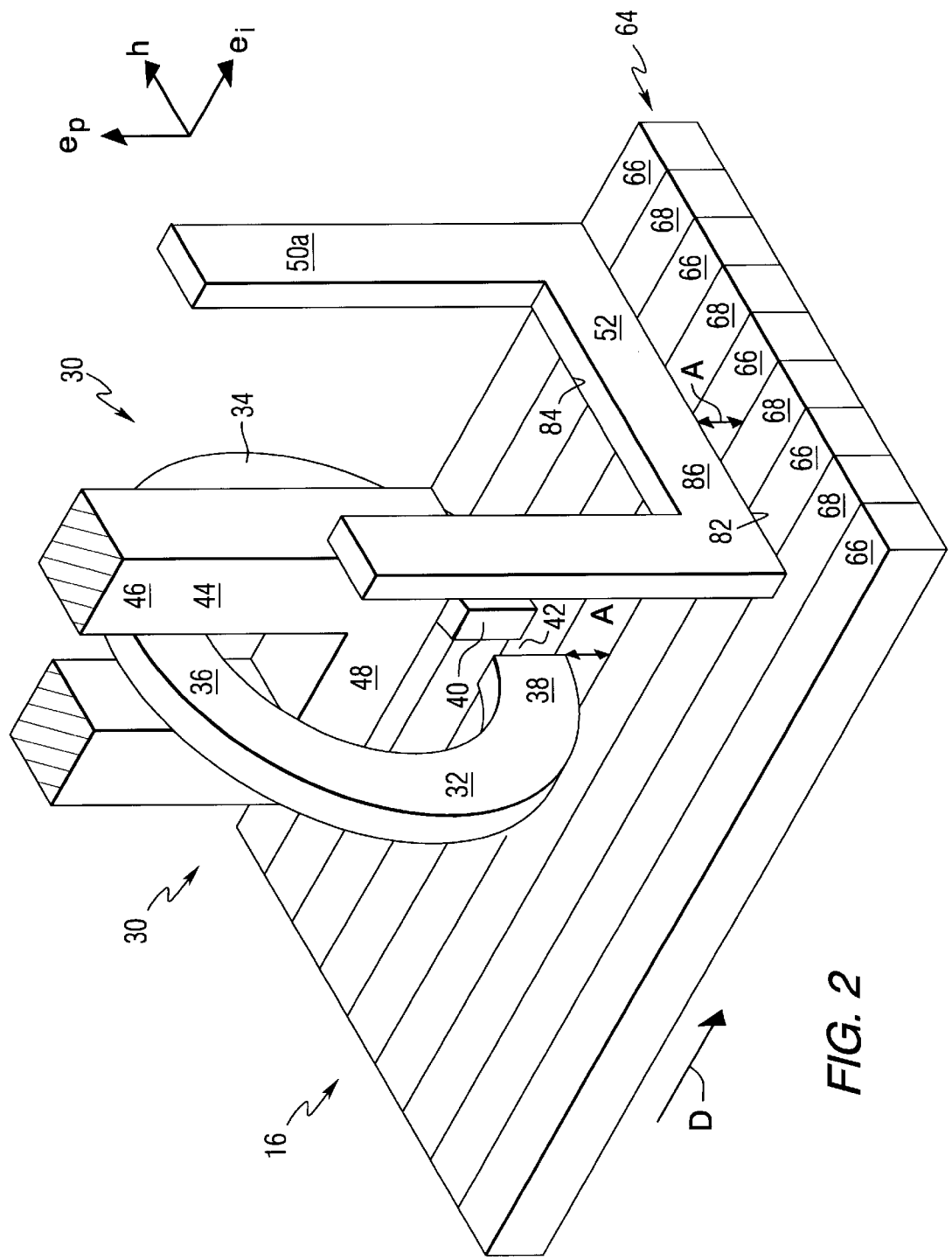
FIG. 2 is a partially schematic, isometric view of one embodiment of a recording head according to the present invention.
Figure 10:
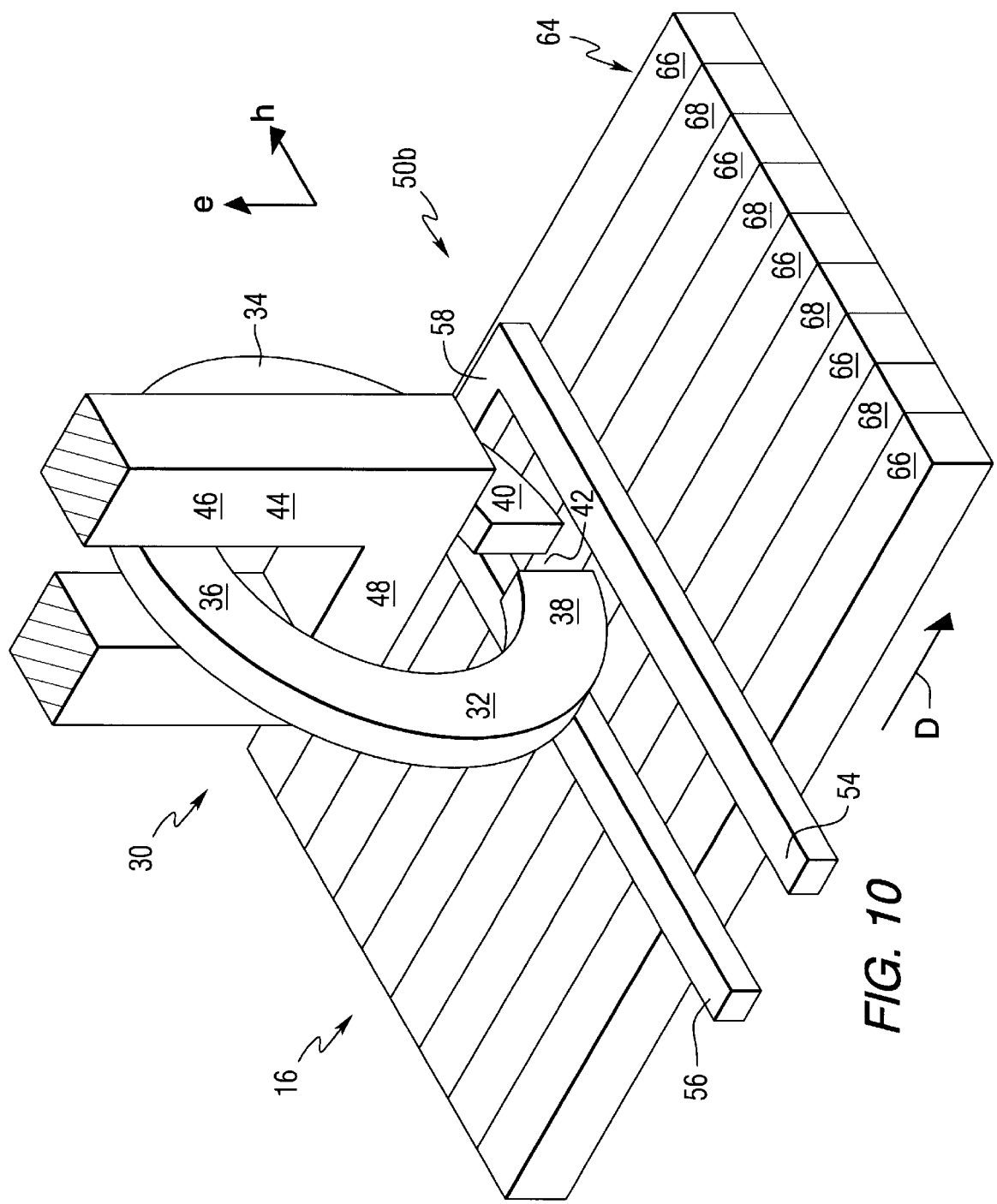
FIG. 10 is a partially schematic, isometric view of another embodiment of a recording head according to the present invention.
Figure 14:
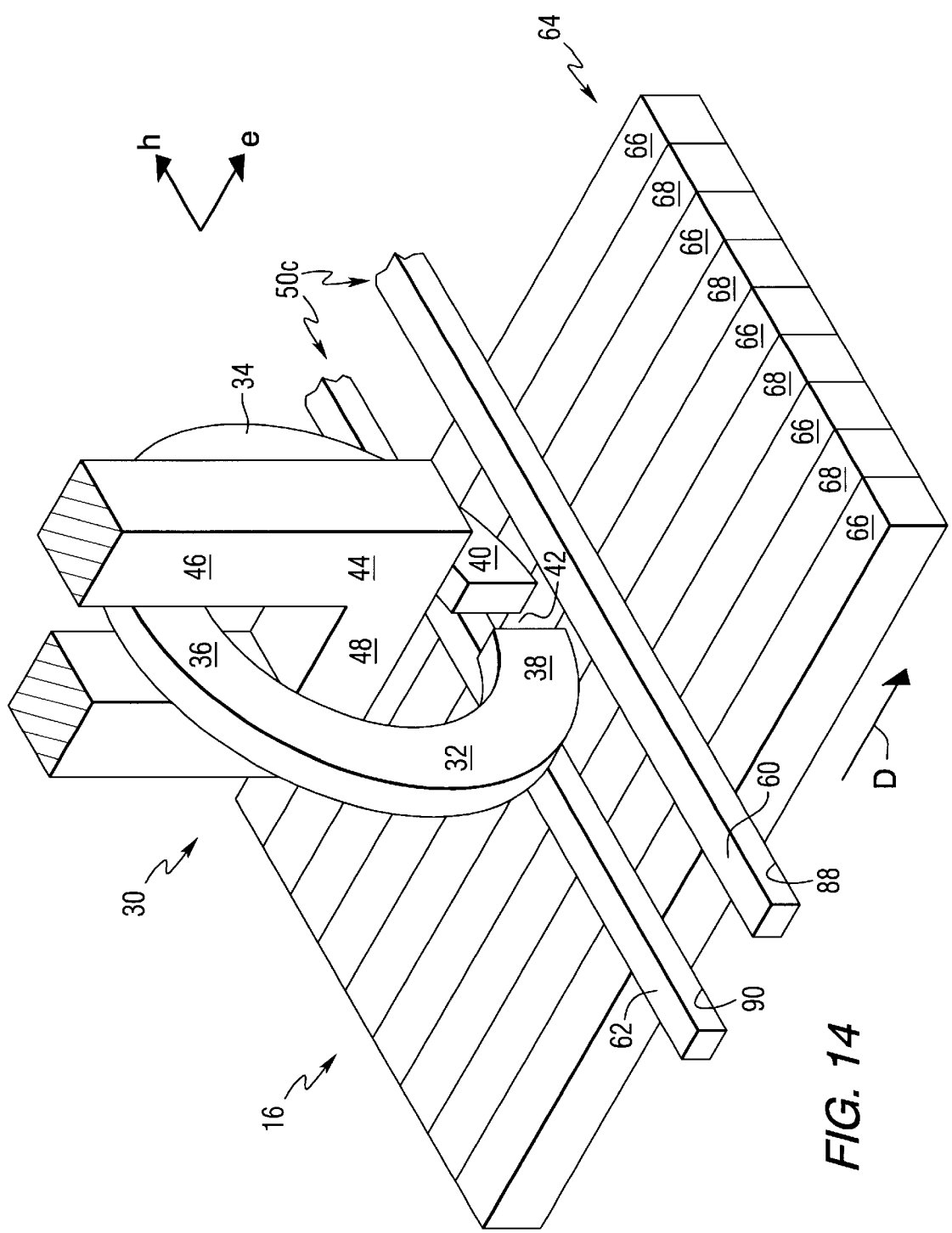
FIG. 14 is a partially schematic, isometric view of an alternative embodiment of a recording head according to the present invention.

Alternative embodiments of a recording head of the present invention are illustrated in FIGS. 2, 10, and 14. The recording head 22 includes a write apparatus 30 having a pair of opposing write poles 32, 34, magnetically coupled by a yoke 36 across the top portions. Each of the write poles 32, 34 includes a pole tip 38, 40 located at the bottom of each pole. The pole tips 38, 40 define a write gap 42 therebetween. The write gap 42 as a width B, and a thickness C, corresponding to the thickness of the write poles 32, 34 (best illustrated in FIG. 3). The width B may be equal to the track width (described below), and may be approximately 5–200 nm, with one example being 45–50 nm. The thickness C will be dependent upon the speed of the magnetic storage medium, and may be 5–200 nm, with 50 to 100 nm being an example.

A coil 44 passes between the two write poles 32, 34. The coil 44 may be any conventionally used coil, including copper, gold, a microstrip waveguide, and/or an asymmetric CPS. One example of such a coil includes at least one microstrip waveguide 46 as a vertical portion, with a short 48 deposited between the poles 32, 34. The coil 44 is dimensioned and configured to induce a magnetic field in the write poles 32, 34, the yoke 36, and write gap 42 when an electrical current is passed through the coil 44.

The recording head 22 also includes a setting coil 50, which may take alternative forms, depending upon the type of recording desired (longitudinal or perpendicular) and the speed of the storage medium. The coil 50 may be any conventionally used coil, including copper, gold, a microstrip waveguide, and/or an asymmetric CPS. One example of the setting coil, 50a, is illustrated in FIG. 2. The setting coil 50a comprises a single turn, located adjacent to and behind the pole tips 38, 40. The setting coil 50a includes a substantially horizontal portion 52, adjacent to and substantially parallel to the surface of the magnetic storage medium 16. Referring to FIG. 10, an alternative setting coil 50b is illustrated. The setting coil 50b includes a pair of turns 54, 56, on opposing sides of the write pole tips 38, 40, and is connected by a short 58. Referring to FIG. 14, yet another embodiment of the setting coil 50c is illustrated. The coil 50c comprises a pair of turns 60, 62 on opposing sides of the write pole tips 38, 40. The turns 60, 62 are not electrically connected to each other.

The opposing write poles 32, 34, and yoke 36 may be formed from a single structure, deposited, sputtered, or plated as a single layer. The use of a single layer to form both write poles and the connect yoke eliminates the necessity of added manufacturing steps, of separately depositing flux return poles, yokes, and main write poles. Additionally, the disadvantage of having layers of material with different thicknesses and widths, and different magnetic properties, is avoided. The only critical dimensions for maximizing recording density and recording speed are the width B and thickness C of the write gap 42, between the pole tips 38, 40. As long as the write poles 32, 34 are sufficiently far apart so that the flow of magnetic flux between these poles is concentrated at the pole tips 38, 40, and to accommodate the coil 44, the other dimensions and configuration of the layer forming the poles 32, 34, and the yoke 36, are not critical, and a wide variety of configurations may be selected. For example, the width of the poles 32, 34, and yoke 36 may be relatively large, thereby providing a sufficiently large path for a strong magnetic field within a relatively thin plating, without adversely impacting the trackwidth. The poles 32, 34 will then taper towards the tips 38, 40, so that the height of the pole tips 38,40 is on the same order of magnitude as the width B. To give some examples of possible recording densities, B=130 nm and C=50 nm results in a recording density of approximately 100 Gbit/in$^2$, and B=50 nm and C=50 nm results in a recording density of approximately 250 Gbit/in$^2$.

A recording head 22 will also typically contain some type of read element, for example, a magnetoresistive, giant magnetoresistive, spin valve, or tunnel magnetoresistive read element. Any conventional read element may be selected. Such read elements are well understood by those skilled in the art, and therefore not shown.

Figure 18:
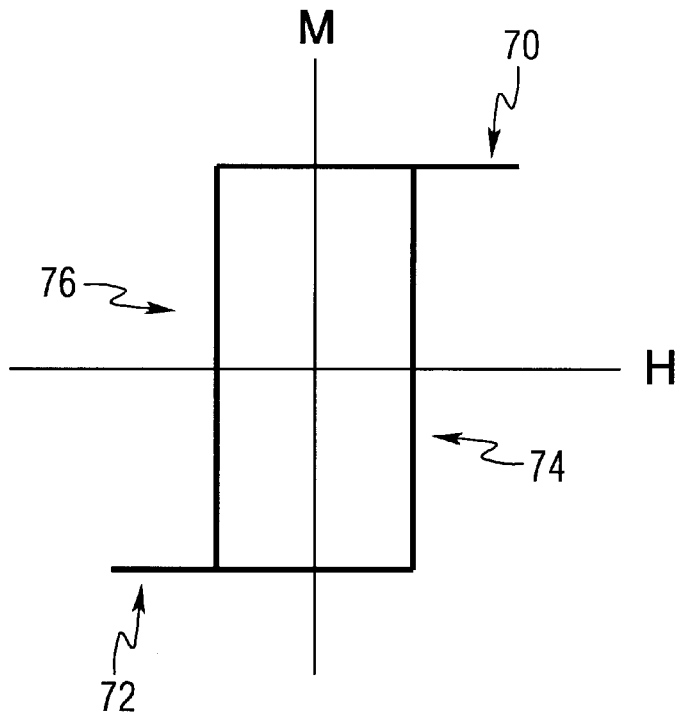
FIG. 18 is a graph illustrating magnetic moment as a function of magnetic field for a magnetic field applied along the easy axis of a ferromagnetic substance.
Figure 19:
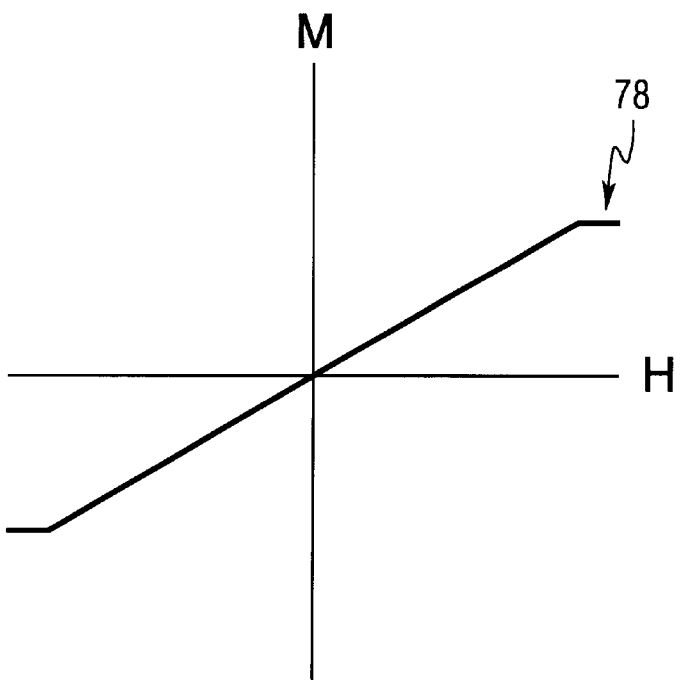
FIG. 19 is a graph illustrating magnetic moment as a function of magnetic field for a magnetic field applied along the hard axis of a ferromagnetic substance.

FIGS. 2, 10 and 14 also illustrate a magnetic storage medium for use with a recording head 22 of the present invention. The magnetic storage medium 16, here a disk, includes a recording layer 64 having a plurality of magnetically permeable tracks 66, which are divided into sectors, with each sector further subdivided into magnetic domains (with a single domain illustrated schematically in FIGS. 3–9, 11–13, and 15–17). The tracks 66 are separated by guard bands 68. The disk 16 may also include other layers which are well understood by those skilled in the art, and therefore not shown. Examples of such additional layers include magnetically soft underlayers (for perpendicular recording), and/or substrate layers. Each magnetic domain within the storage medium 16 will have an easy axis, with which the magnetizations within these domains will tend to align themselves and a hard axis, perpendicular to the easy axis, towards which the magnetizations within a domain may rotate once subjected to an appropriate magnetic field. Rotation of the magnetizations within a given magnetic domain with respect to the easy axis and hard axis are illustrated in FIGS. 18 to 19. When a magnetic domain is not subject to any magnetic fields, or when subject to a magnetic field oriented along the easy axis, the magnetization will be oriented along the easy axis, as illustrated by the line 70, 72 in FIG. 18. When a domain is subjected to a magnetic field equal in or exceeding the points 74, 76, if the magnetization is oriented antiparallel to the magnetic field, the magnetization will rotate to conform to that magnetic field. The magnetization will remain so oriented, even upon removal of the magnetic fields, until another antiparallel magnetic field of at least the magnitude 74, 76 is applied to the domain. The tracks 66 may be made from an underdamped material with respect to magnetization switching.

In use, the recording head 22 will be separated from the magnetic storage medium 16 by a distance known as the flying height A. The flying height A is sufficiently small so that a high concentration of flux within the write gap 42 will pass through the track 66, but sufficiently large to prevent damage to the disc 16 from contact with the recording head 22. The disc 16 will be rotated so that the track 66 under the recording head 22 will move in the direction of arrow D.

When the magnetic domain is subjected to a magnetic field oriented parallel to the hard axis, the magnetization within that domain will be subjected to a moment tending to rotate the magnetization towards an orientation parallel with the applied magnetic field, and therefore with the hard axis. The relationship between the applied magnetic field and the resulting magnetic moment acting upon the magnetization is illustrated by the line 78 in FIG. 19. If a magnetic field substantially parallel to the hard axis is then removed, the magnetization will tend to orient itself back to its original position, parallel to the easy axis. Therefore, a magnetic field oriented parallel to the hard axis, exceeding the magnitudes 74, 76 in FIG. 18, will rotate the magnetization within the domain sufficiently close to parallel to the hard axis so that, upon removal of the magnetic field, the magnetization will be approximately equally free to rotate into an orientation either parallel or antiparallel to its original orientation along the easy axis. All that is required at this point to select the final orientation of the magnetization is a relatively weak magnetic field applied in the direction of the desired orientation of the magnetization for the domain in question, although a stronger magnetic field could obviously be used as well to increase switching speed.

The present invention has the advantage of applying maximum torque to a magnetization within the storage media during application of both the switching field and the setting field. Torque magnitude is calculated according to the equation $T = MH\sin\theta$, where T=magnitude of the torque, M=the magnitude of the magnetic moment of the magnetization being acted upon, H=the magnitude of the magnetic field applied to the magnetization, and $\theta$=the angle between M and H. Therefore, torque is maximized by applying the switching field (H) substantially perpendicular to the direction of media magnetization, as in the present invention. Likewise, torque is minimized by applying the switching field parallel to the direction of media magnetization, as in the prior art. Therefore, although applying the switching field substantially perpendicular appears to be most advantageous, it is within the scope of the present invention to apply the switching field at angles other than perpendicular, which will still provide a torque advantage over the prior art. Additionally, because the magnetic storage media 16 may be underdamped, it may be advantageous to select an angle other than perpendicular to take advantage of magnetization oscillations during switching.

This method of writing to the disk 16 is best explained by examining some step-by-step examples of perpendicular and longitudinal writing using the recording head 22 of the present invention.

Figure 3:
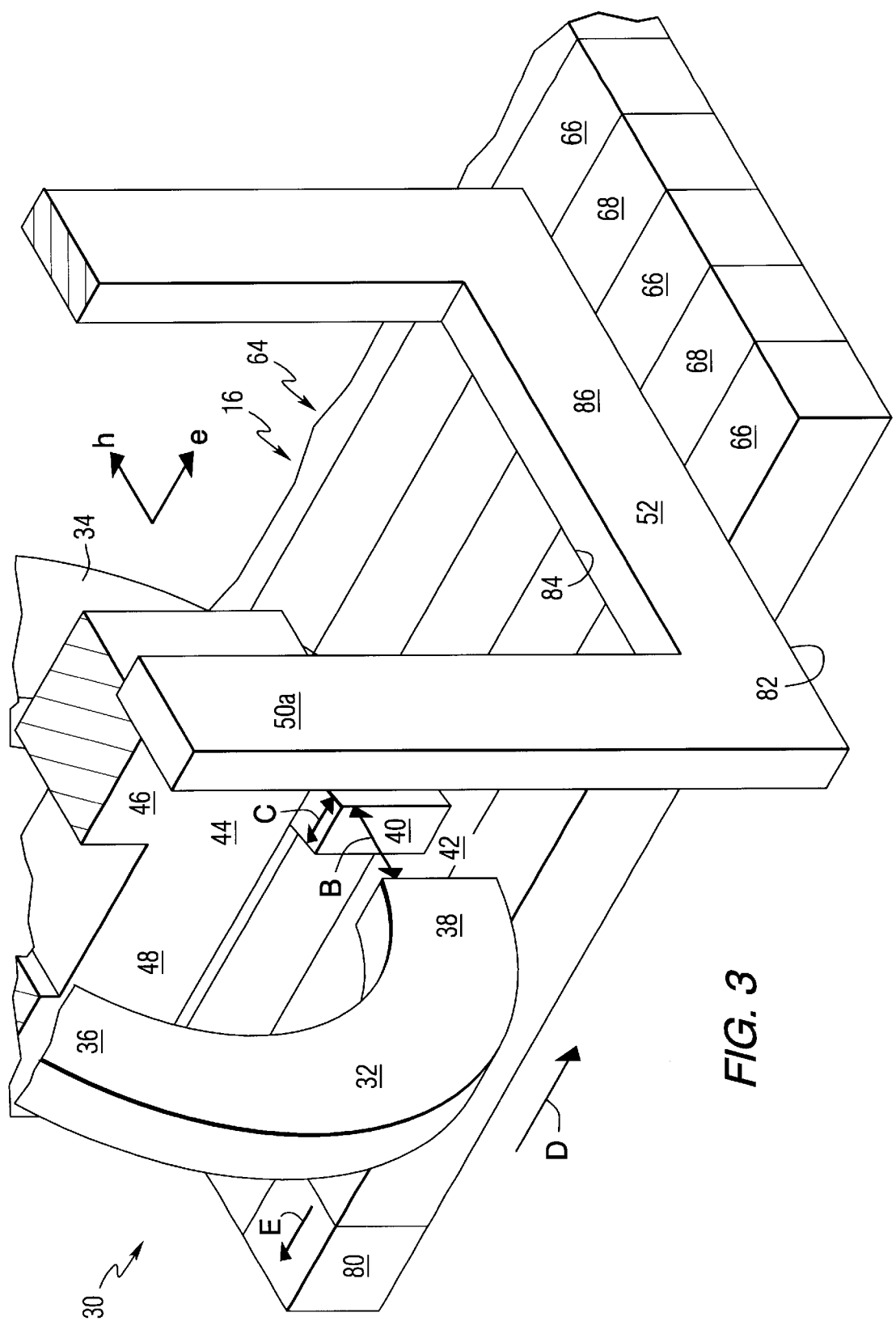
FIG. 3 is a partially schematic, isometric view of the embodiment of FIG. 2, illustrating a single magnetic domain prior to a longitudinal write operation.
Figure 4:
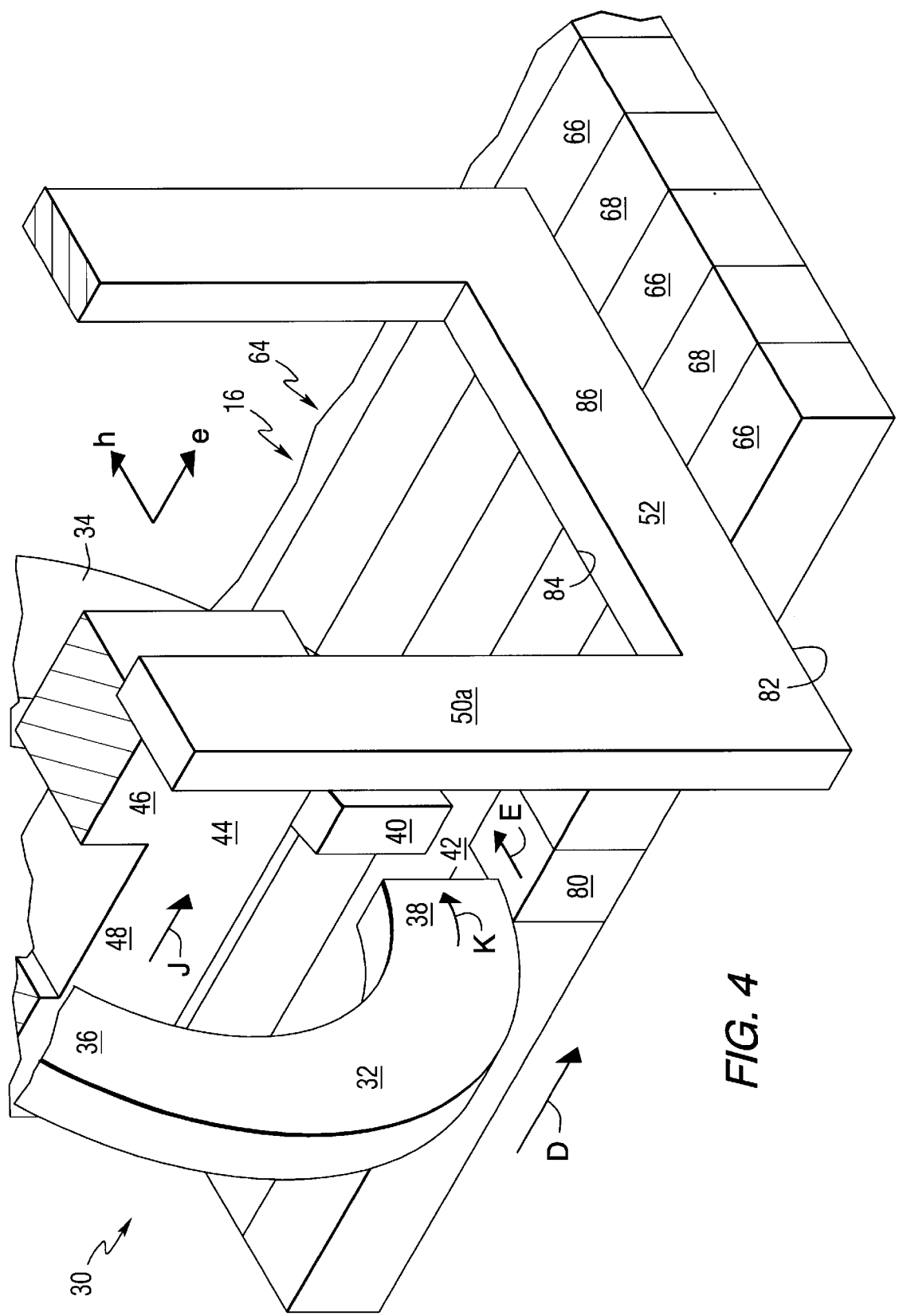
FIG. 4 is a partially schematic, isometric view of the embodiment of FIG. 2, illustrating a single magnetic domain during the first step of the longitudinal write operation.
Figure 5:
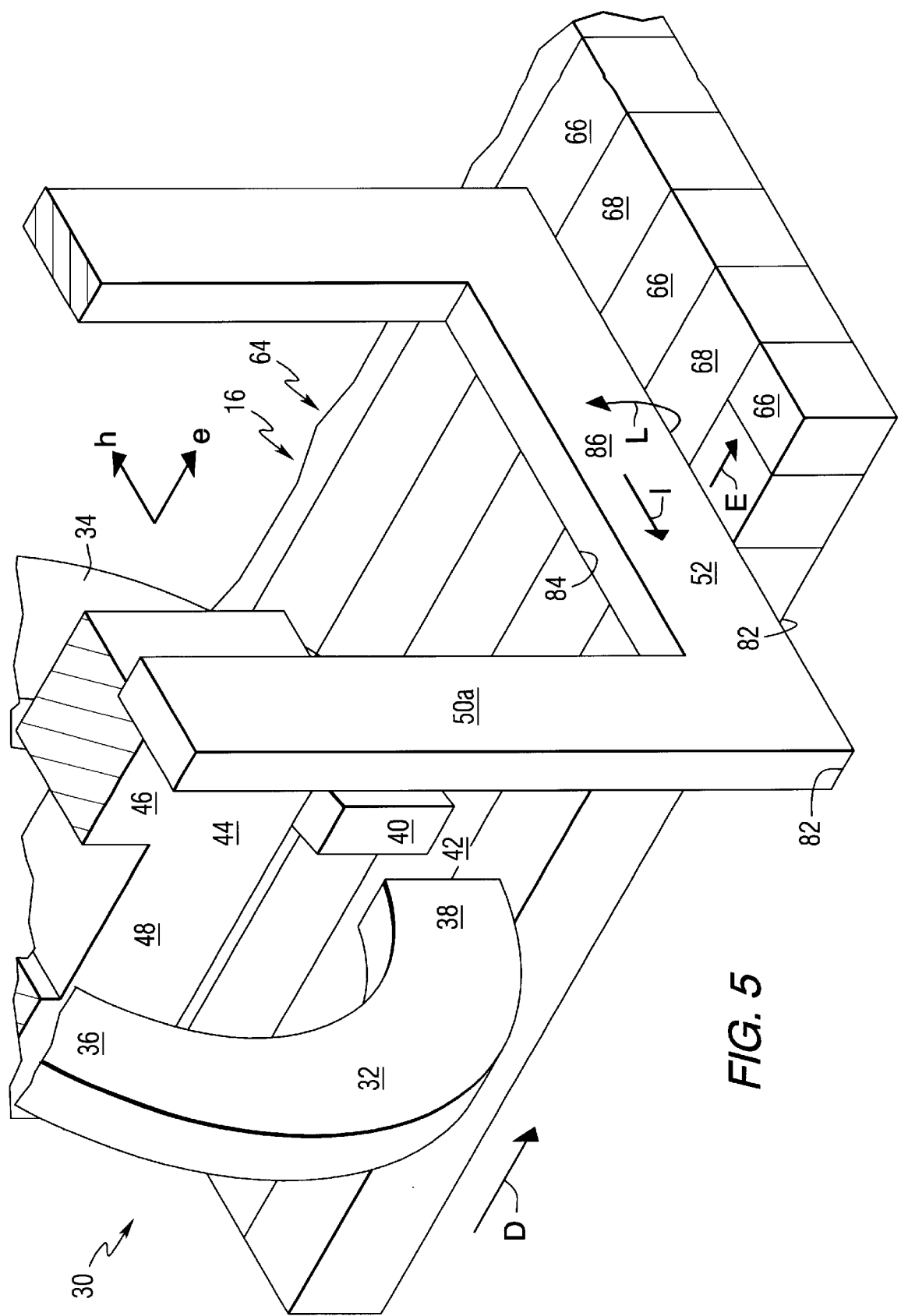
FIG. 5 is a partially schematic, isometric view of the embodiment of FIG. 2, illustrating a single magnetic domain during the second step of a longitudinal write operation.

Use of the embodiment of FIG. 2 for longitudinal recording is illustrated in FIGS. 3–5. An individual magnetic domain 80 within a track 66 is illustrated. Prior to the write operation, the domain 80 has a magnetization E oriented parallel to the easy axis of the material. In the illustrated example, the magnetization E is oriented antiparallel to the direction of travel of the disk D. As the domain 80 passes under the opposing write pole tips 38, 40, a current induced in the coil 44, indicated by the arrow J, induces a magnetic field within the write poles 32, 34, the yoke, 36, and the write gap 42, indicated by the arrow K. This magnetic field will rotate the magnetization E away from the easy axis, so that it is oriented substantially parallel to the hard axis. As the disk 16 moves some of the domain 80 moves away from this magnetic field, the magnetization E is free to rotate in either direction towards the easy axis. A current is induced in the coil 50a, indicated by the arrow I, thereby generating a magnetic field around to the coil 50a corresponding to the well known right hand rule, indicated by the arrow L. In the present example, it is desired to rotate the magnetization E so that it is parallel to the direction of travel of the recording medium 16. Therefore, a current I supplied in the direction illustrated will, according to the right hand rule, produce a magnetic field L oriented parallel to the disk 16 at the bottom surface 82 of the coil 50a. This magnetic field L, which may be (but is not required to be) relatively weak as compared to the magnetic field within the write gap 42, will be sufficient to ensure that, when the magnetization E rotates back towards the easy axis, it will rotate in the desired direction.

Figure 6:
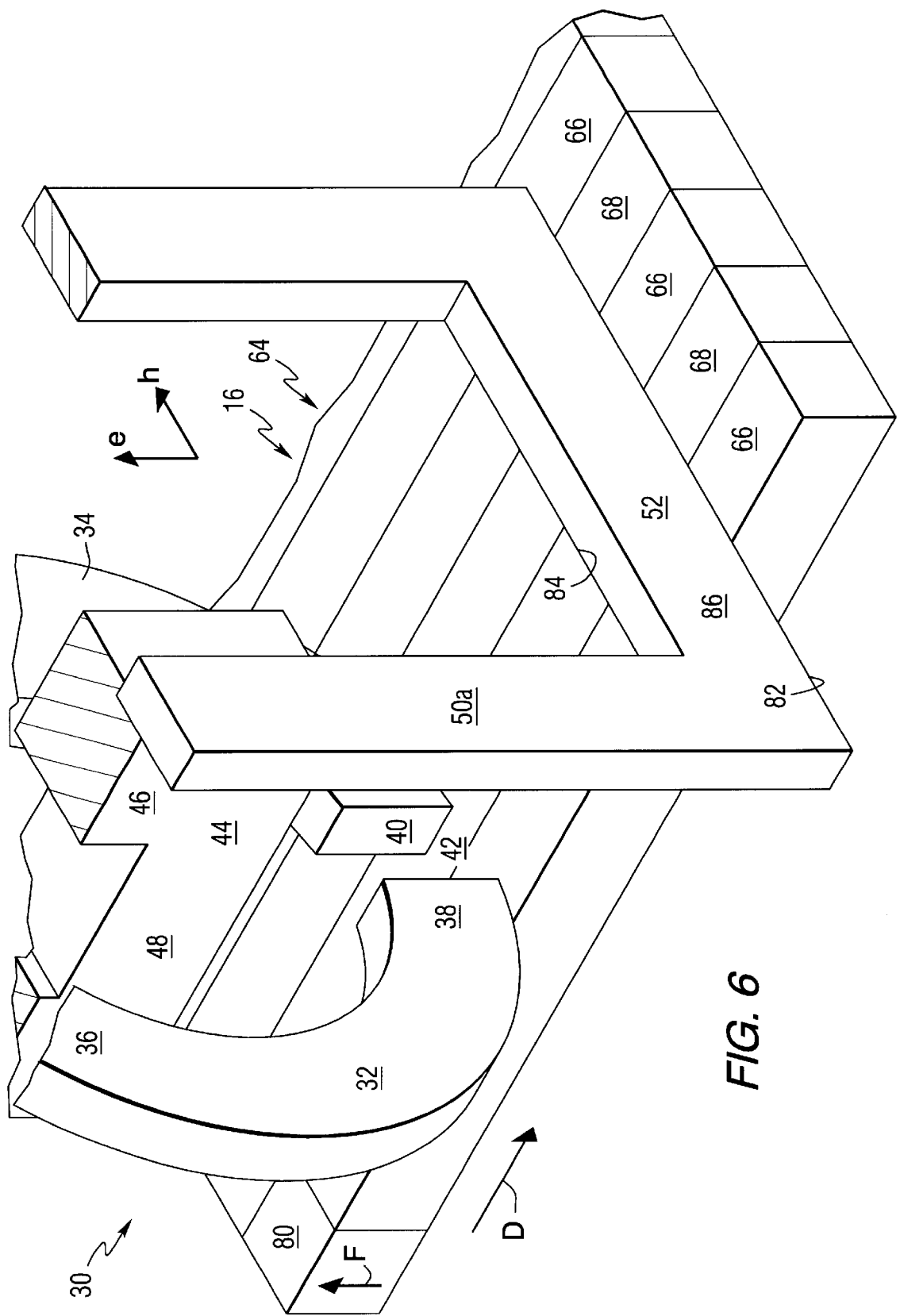
FIG. 6 is a partially schematic, isometric view of the embodiment of FIG. 2, illustrating a single magnetic domain prior to a perpendicular write operation.
Figure 7:
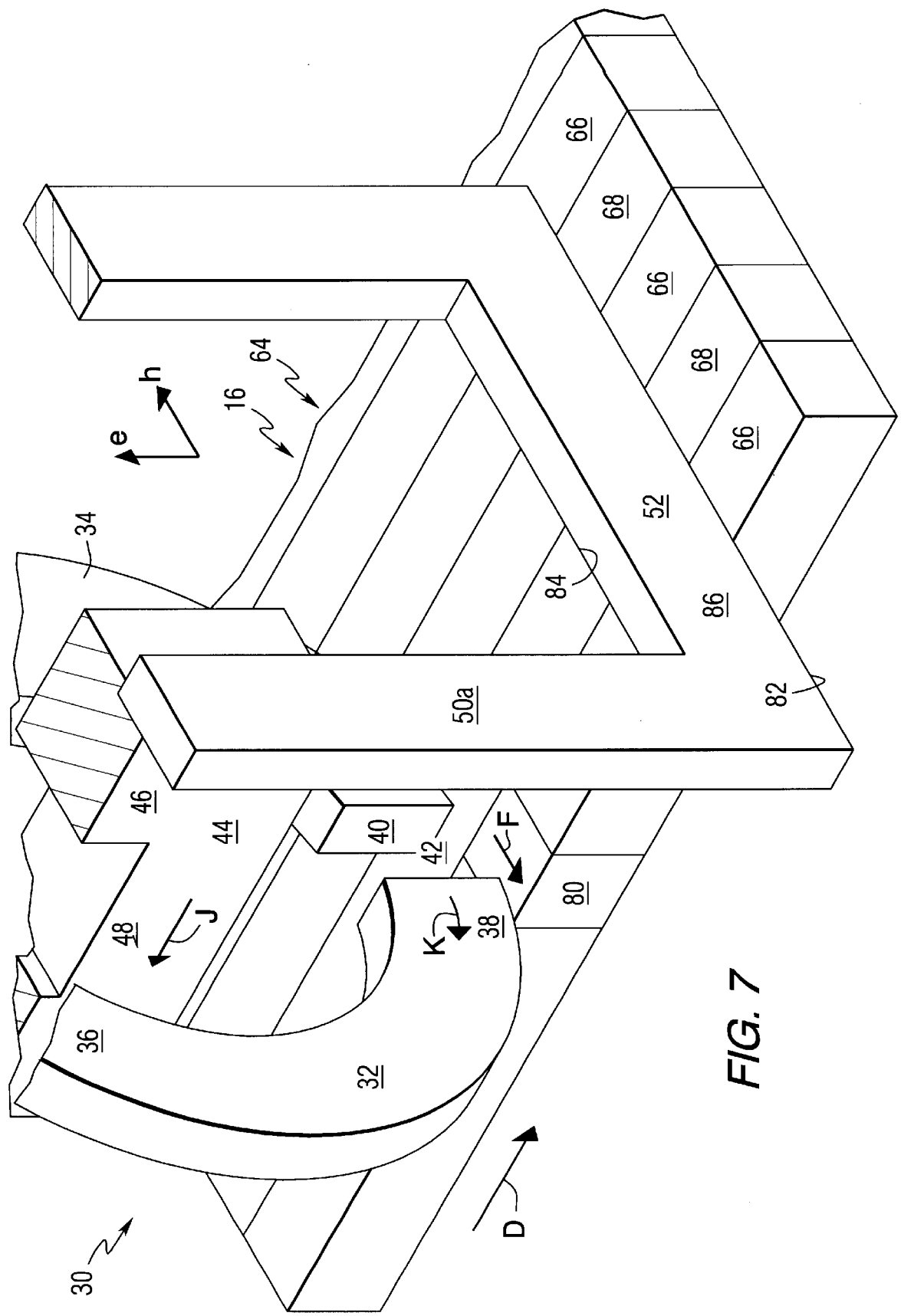
FIG. 7 is a partially schematic, isometric view of the embodiment of FIG. 2, illustrating a single magnetic domain during the first step of a perpendicular write operation.
Figure 8:
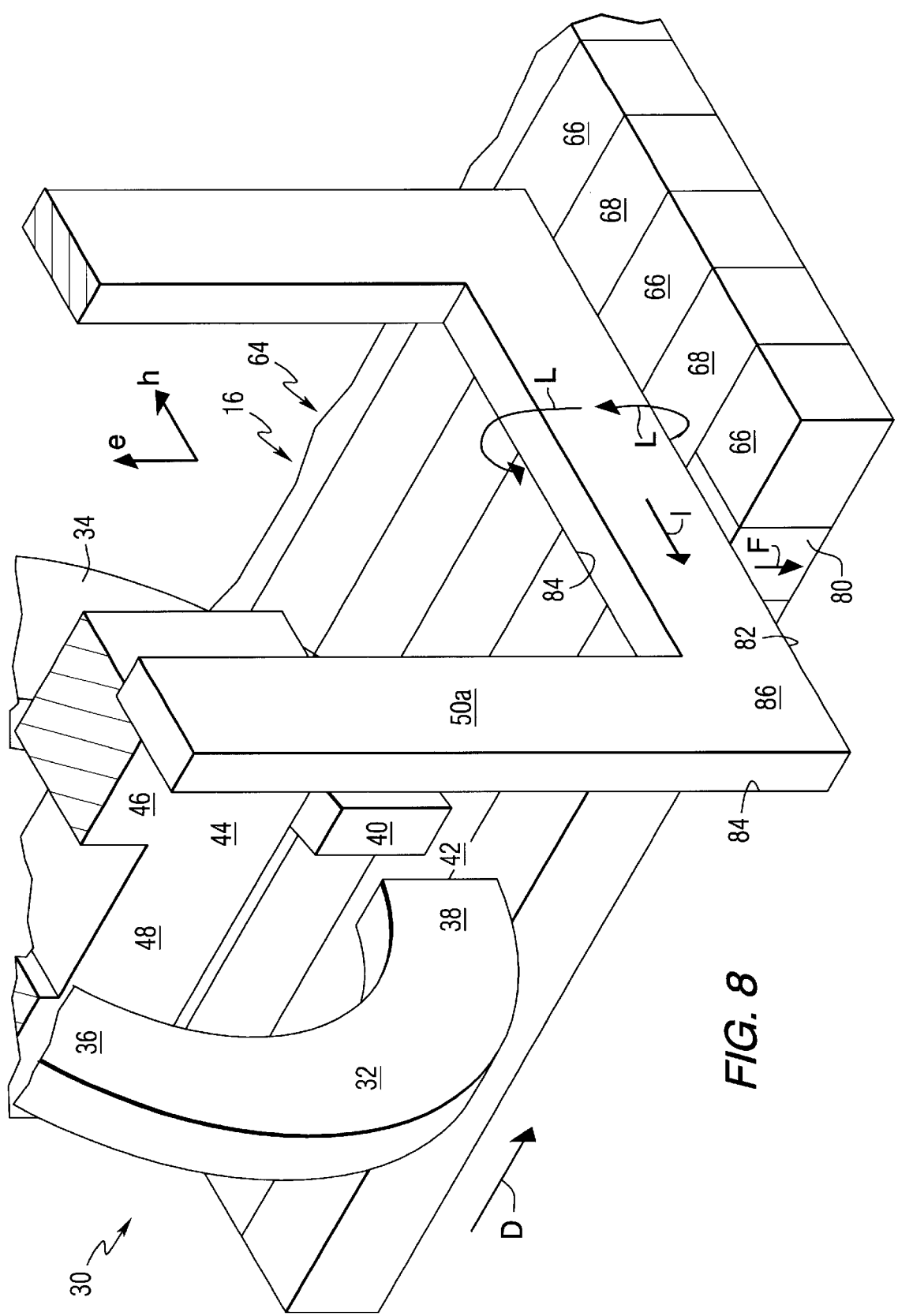
FIG. 8 is partially schematic, isometric view of the embodiment of FIG. 2, illustrating a single magnetic domain during the second step of a perpendicular write operation.
Figure 9:
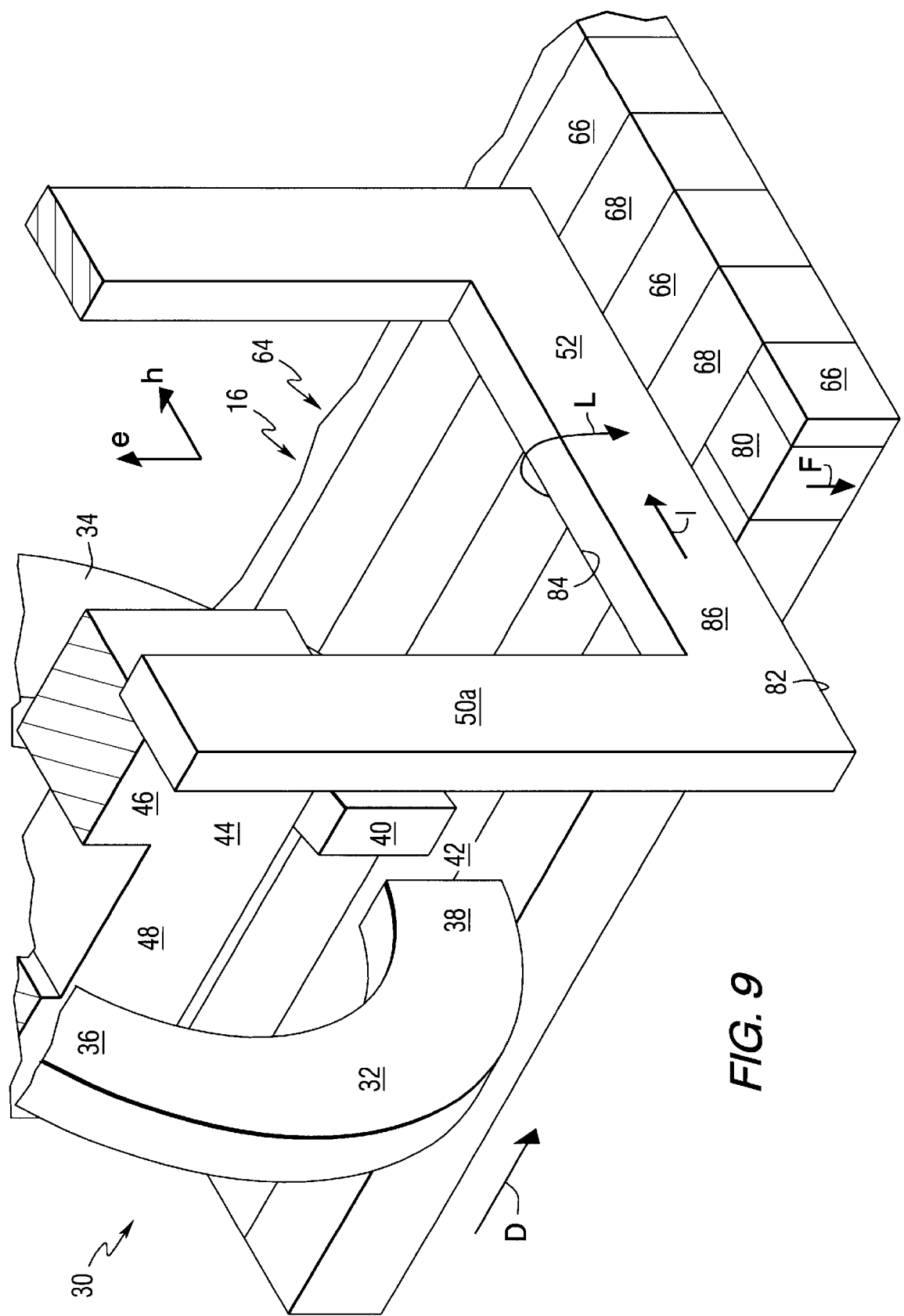
FIG. 9 is a partially schematic, isometric view of the embodiment of FIG. 2, illustrating a single magnetic domain during an alternative second step of a perpendicular write operation.

FIGS. 6–9 illustrates the use of the embodiment of FIG. 2 for perpendicular recording. FIG. 6 illustrates the magnetic domain 80, having magnetization F, oriented parallel to the easy axis, in this example vertical and pointed upward. As the domain 80 passes under the write pole tips 38, 40, illustrated in FIG. 6, a current J is induced in the coil 44, thereby inducing a magnetic field K within the write gap 42. The magnetization F is rotated to correspond to this magnetic field, thereby rotating away from the easy axis so that it is parallel to the hard axis, corresponding to the track width. As the disk continues to move so that the domain 80 is moved away from the write gap 42, the magnetization F is free to rotate in either direction towards the easy axis. A current I is induced in the coil 50a, thereby inducing a magnetic field L surrounding the coil 50a according to the right hand rule. In this example, it is desired that the final orientation of the magnetization F be oriented downward. Therefore, either the magnetic field L corresponding to the front 84 or the back 86 of the coil 50a may be used. FIG. 8 illustrates the use of the front 84 of the coil 50a. The current I is directed so that the magnetic field L produced according to the right hand rule will be oriented downward at the front surface 84 of the coil 50*a*, thereby causing the magnetization F to be oriented downward. Alternatively, the rear surface 86 of the coil 50*a* may be used as illustrated in FIG. 9, wherein a current I in the opposite direction induces a magnetic field L oriented downward at the back 86.

In the examples of FIGS. 3–9, the speed of the disk 16 and distance between the pole tips 38, 40 and the coil 50*a* will be selected so that the magnetizations E, F will be exposed to the magnetic field K from the coil 50*a* at the proper time to ensure the proper rotation.

Figure 11:
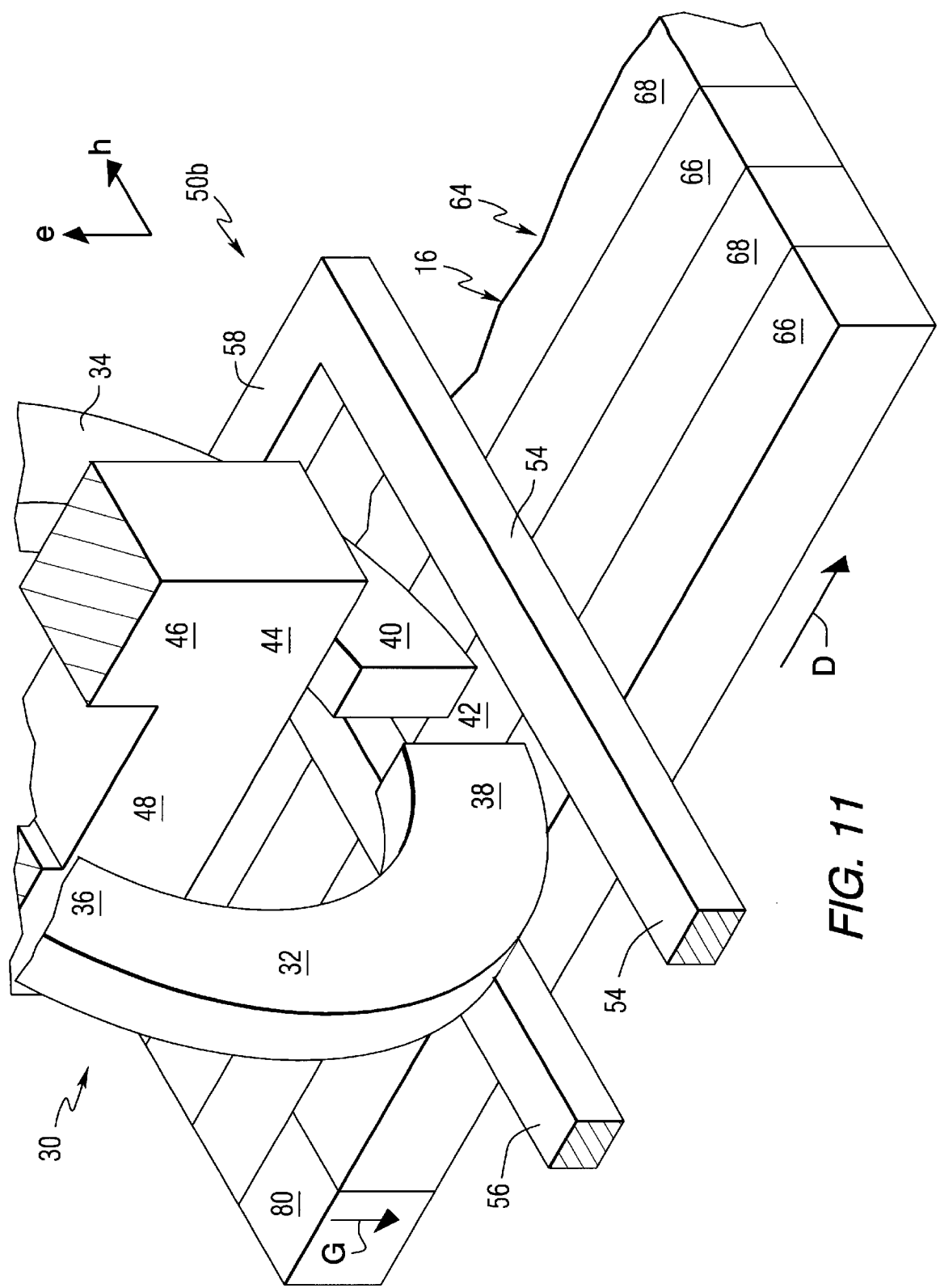
FIG. 11 is a partially schematic, isometric view of the embodiment of FIG. 10, illustrating a single magnetic domain prior to a perpendicular write operation.
Figure 12:
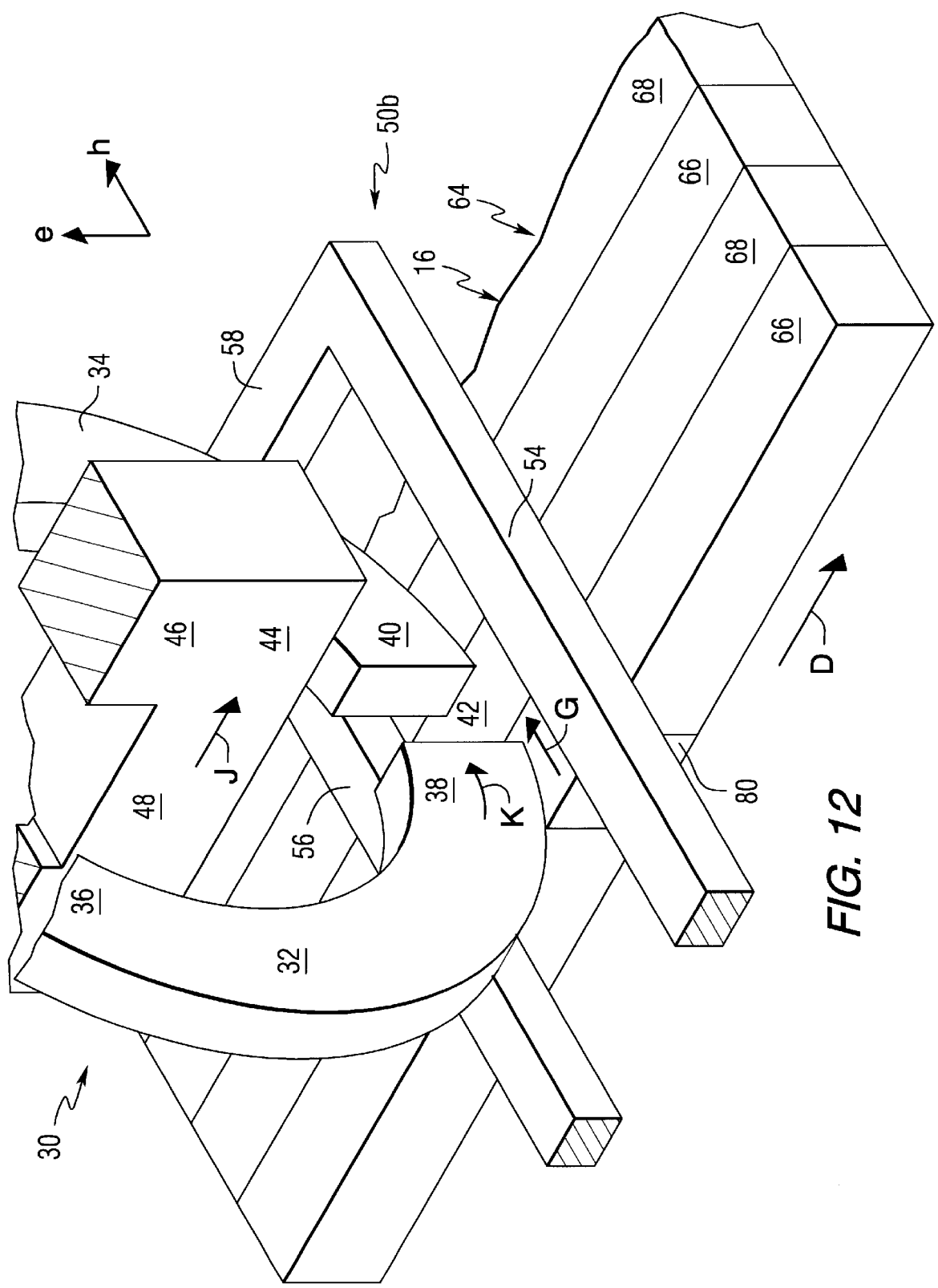
FIG. 12 is a partially schematic, isometric view of the recording head of FIG. 10, illustrating a single magnetic domain during the first step of a perpendicular write operation.
Figure 13:
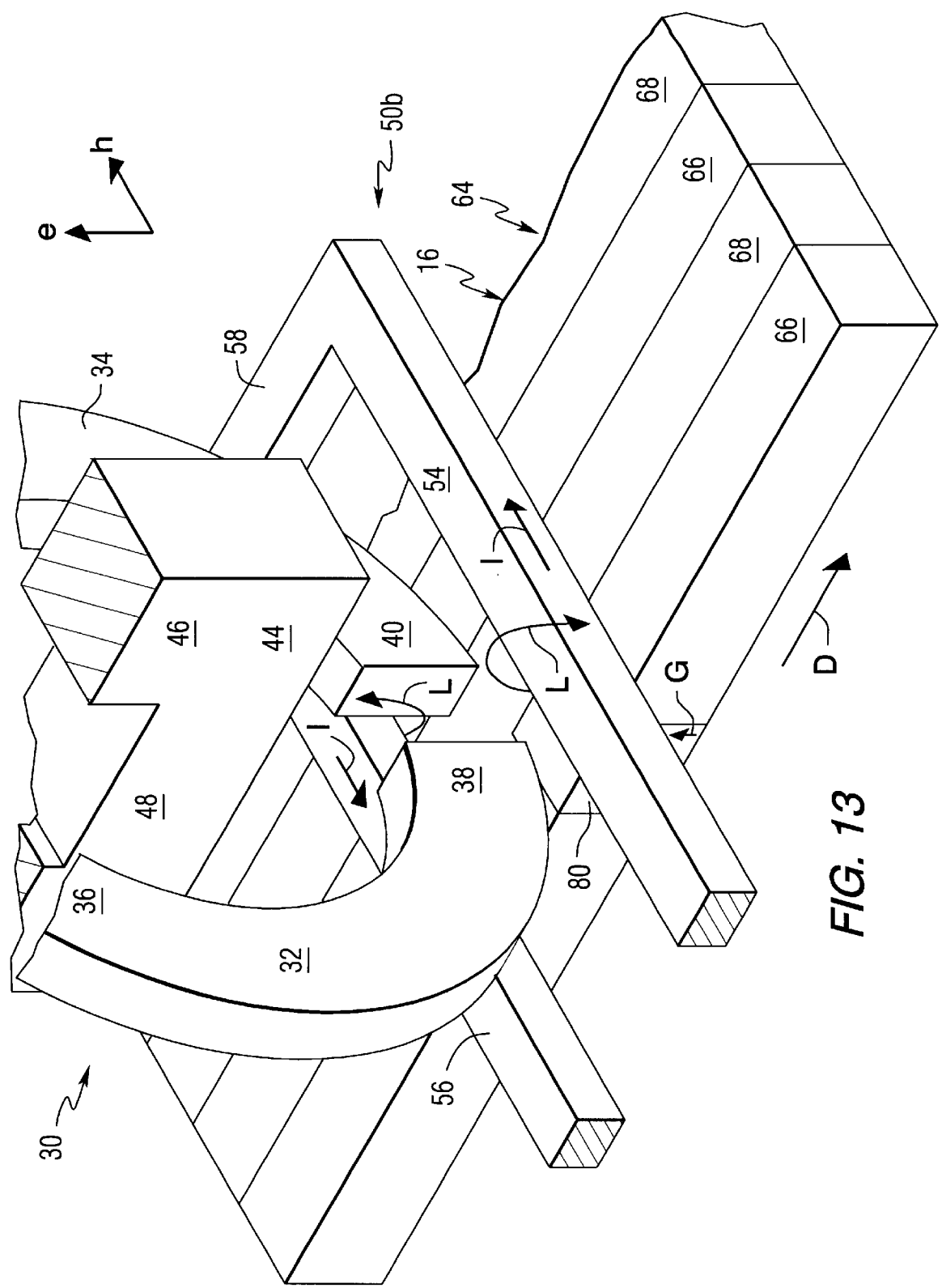
FIG. 13 is a partially schematic, isometric view of the recording head of FIG. 10, illustrating a single magnetic domain during the second step of a perpendicular write operation.

FIGS. 11–13 illustrate the use of the embodiment of FIG. 10 to perform perpendicular writing. FIG. 11 illustrates the domain 80, having the magnetization G, oriented parallel to the easy axis of the material of the track 66, in this case vertical, with the magnetization G oriented downward. As the movements of the disk 16 brings the domain 80 underneath the write gap 42, a current J within the coil 44 induces a magnetic field K within the write gap 42, causing the magnetization G to become aligned with this magnetic field. The magnetization G is now aligned parallel to the hard axis of the material, and parallel to the trackwidth. In this position, the magnetization G would be free to rotate towards a vertical position oriented either upward or downward with approximately equal likelihood upon removal of the magnetic field within the write gap 42. As shown in FIG. 13, a current induced in the coil 50*b* causes a magnetic field surrounding the coil 50*b*, oriented according the right hand rule. In the present example, it is desired to orient the magnetization G upward. Therefore, the direction of the current I through the coil 50*b* is selected so that the magnetic field L between the turns 54, 56 is oriented upward. This magnetic field may be (but is not required to be) relatively weak as compared to the magnetic field that was formerly in the write gap 42, but is sufficient to ensure that, upon the return of the magnetization G towards its default orientation parallel to the easy axis, it is oriented in the desired direction (upward or downward).

Figure 15:
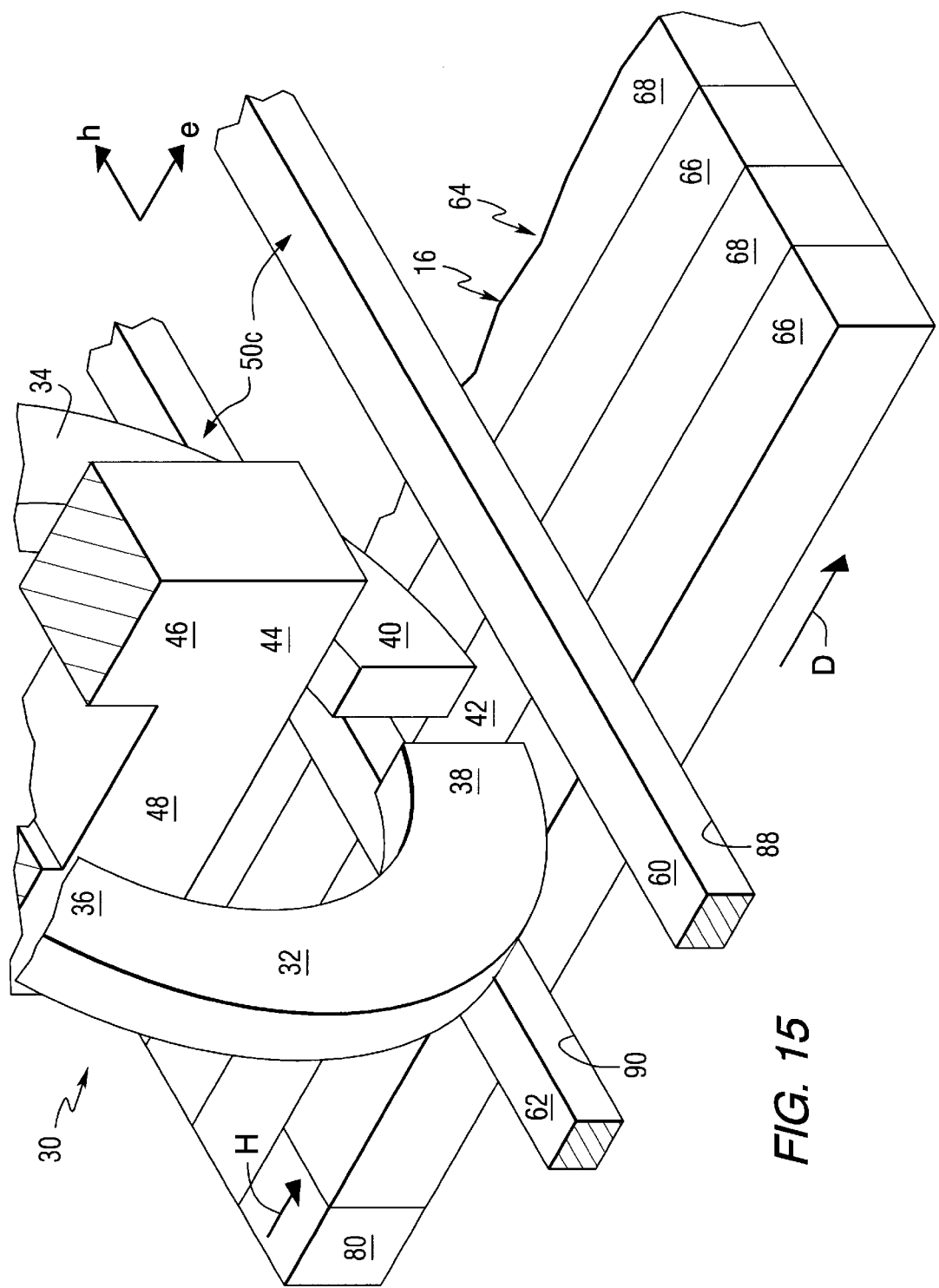
FIG. 15 is a partially schematic, isometric view of the recording head of FIG. 14, illustrating a single magnetic domain prior to a longitudinal write operation.
Figure 16:
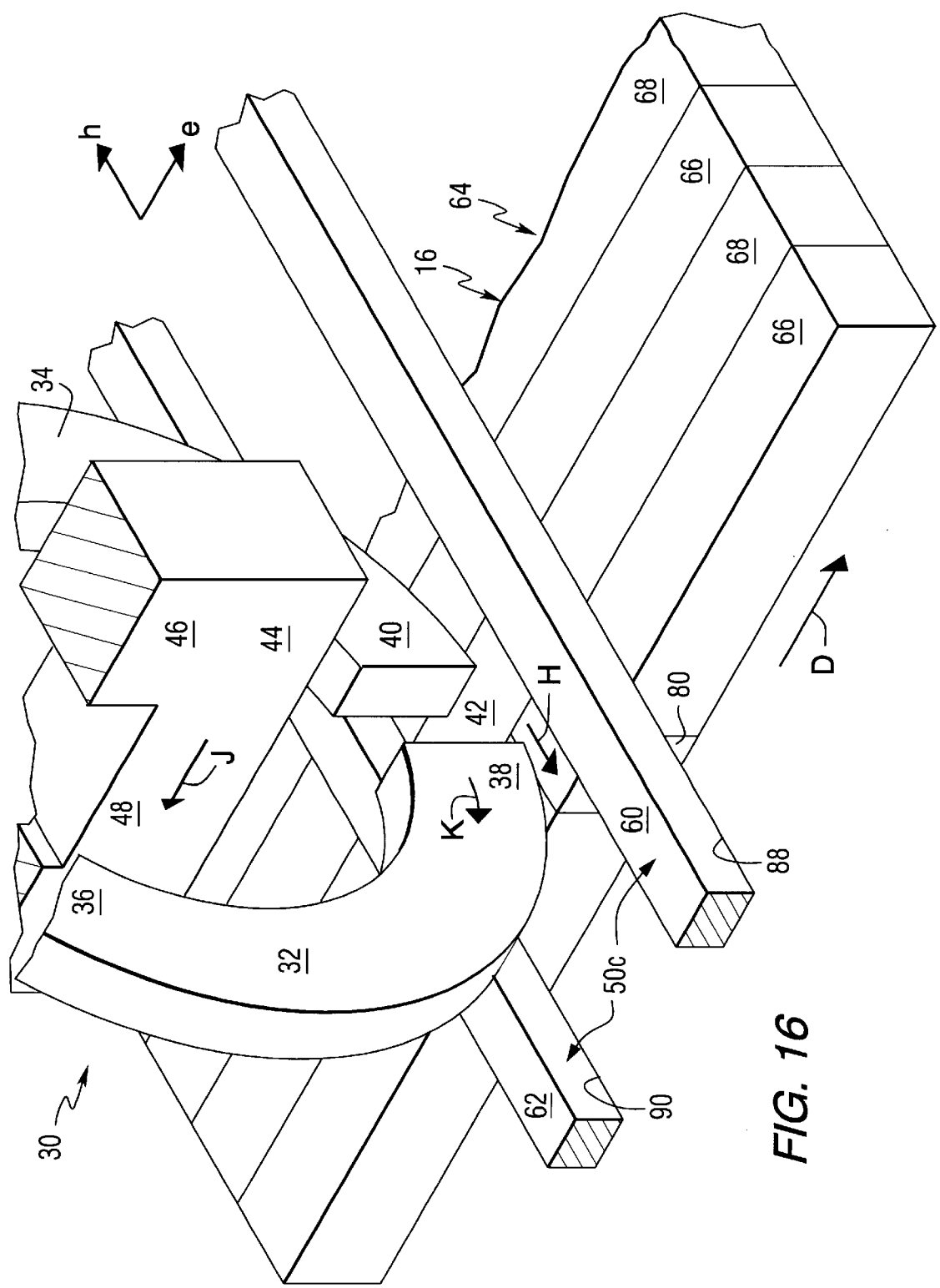
FIG. 16 is a partially schematic, isometric view of the recording head of FIG. 14, illustrating a single magnetic domain during the first step of the longitudinal write operation.
Figure 17:
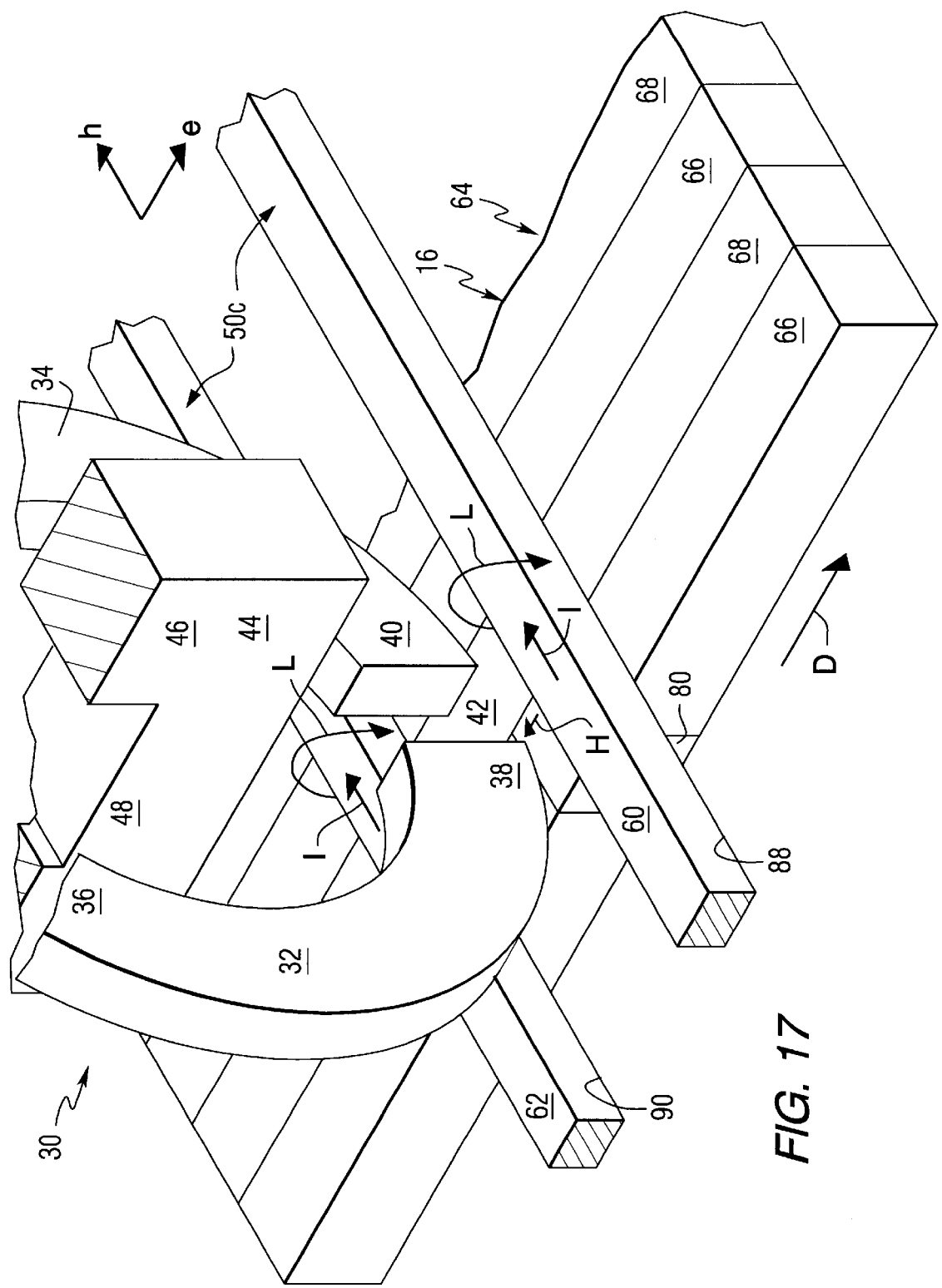
FIG. 17 is a partially schematic, isometric view of the recording head of FIG. 14, illustrating a single magnetic domain during the second step of a longitudinal write operation.

FIGS. 15–17 illustrate the use of the embodiment of FIG. 14 to perform longitudinal writing. FIG. 15 illustrates the magnetic domain 80 of the track 66 prior to the write operation, having a magnetization H oriented parallel to the easy axis of the material. In this case, the magnetization H is oriented parallel to the direction of travel of the disk 16. As the disk 16 moves to the position illustrated in FIG. 16, wherein the domain 80 is within the write gap 42, current J within the coil 44 induces a magnetic field K within the write gap 42, thereby causing the magnetization H to rotate towards the orientation of this magnetic field. The magnetization H is therefore oriented parallel to the hard axis, and also parallel to the trackwidth. Upon removal of the magnetic fields within the write gap 42, the magnetization H will tend to rotate back towards the easy axis, and will be approximately equally free to rotate either parallel or antiparallel to its original position. To ensure the magnetization H rotates towards the desired direction, a current I will be induced within the turns 60, 62, with the current I in both turns flowing in the same direction. The resulting magnetic field L corresponding to the bottom surfaces 88, 90 of the turns 60, 62 will correspond to the desired final orientation of the magnetization H. This magnetic field L, although it may be (but is not required to be) weak relative to the magnetic field within the write gap 42, is sufficient to ensure that, when a magnetization H rotates back towards the easy axis, its final orientation is the desired one, in this example antiparallel to the direction of travel of the disk 16.

Presently available recording heads apply a magnetic field parallel to the final desired orientation of the magnetization within the domain upon which a write operation is being performed. A write operation performed in this manner will provide less time for thermal energy to assist in switching as the data transfer rate increases. The result is higher thermal barriers. The present invention overcomes this disadvantage by applying the write magnetic field at a 90-degree angle to the original and final desired orientations of the magnetic domain in question, and then providing a setting magnetic field to ensure that magnetization within the domain has the correct orientation as it returns to the easy axis. Applying a magnetic field at 90 degrees to the media magnetization provides maximum magnetic torque to the magnetizations, thereby making it significantly easier to rotate these magnetizations. Therefore, a pair of weaker magnetic fields may accomplish switching in the same amount of time required for a stronger antiparallel magnetic field, or an equally strong pair of magnetic fields may accomplish switching in less time. Additionally, the ability to make the write poles 32, 34 relatively wide (tapering towards the pole tips 38, 40) without negatively affecting the trackwidth provides a sufficiently wide path for flux transmission while maintaining a thin film geometry that will allow further increases in the data transfer rate. For example, the ferromagnetic frequency in a Pt/Co magnetic storage medium with a saturation magnetic moment of 1.7 T, with an applied magnetic field of 2 kOe is approximately 16 GHz. Given this frequency, the storage medium 16 may be switched at a speed of approximately 22 ps, as compared with projected switching speeds of approximately 500 ps for present state of the art antiparallel systems. Therefore, with the present invention, data transfer rates are limited by the head switching speed instead of the media switching speed.

A recording head 22 of the present invention may also be used to apply a switching field in a direction other than perpendicular. This is accomplished by combining the magnetic fields applied within the write gap 42 with the magnetic field resulting from a current through the coil 50. Selecting the current J through the coil 44, and the current I through the coil 50 permits controlling the magnitude of the magnetic field K across the write gap 42, and the magnetic field L around the coil 50. The total magnetic field to which the magnetization G or H is exposed will have a magnitude and direction determined by vector addition of the magnetic fields K and L.

Figure 20:
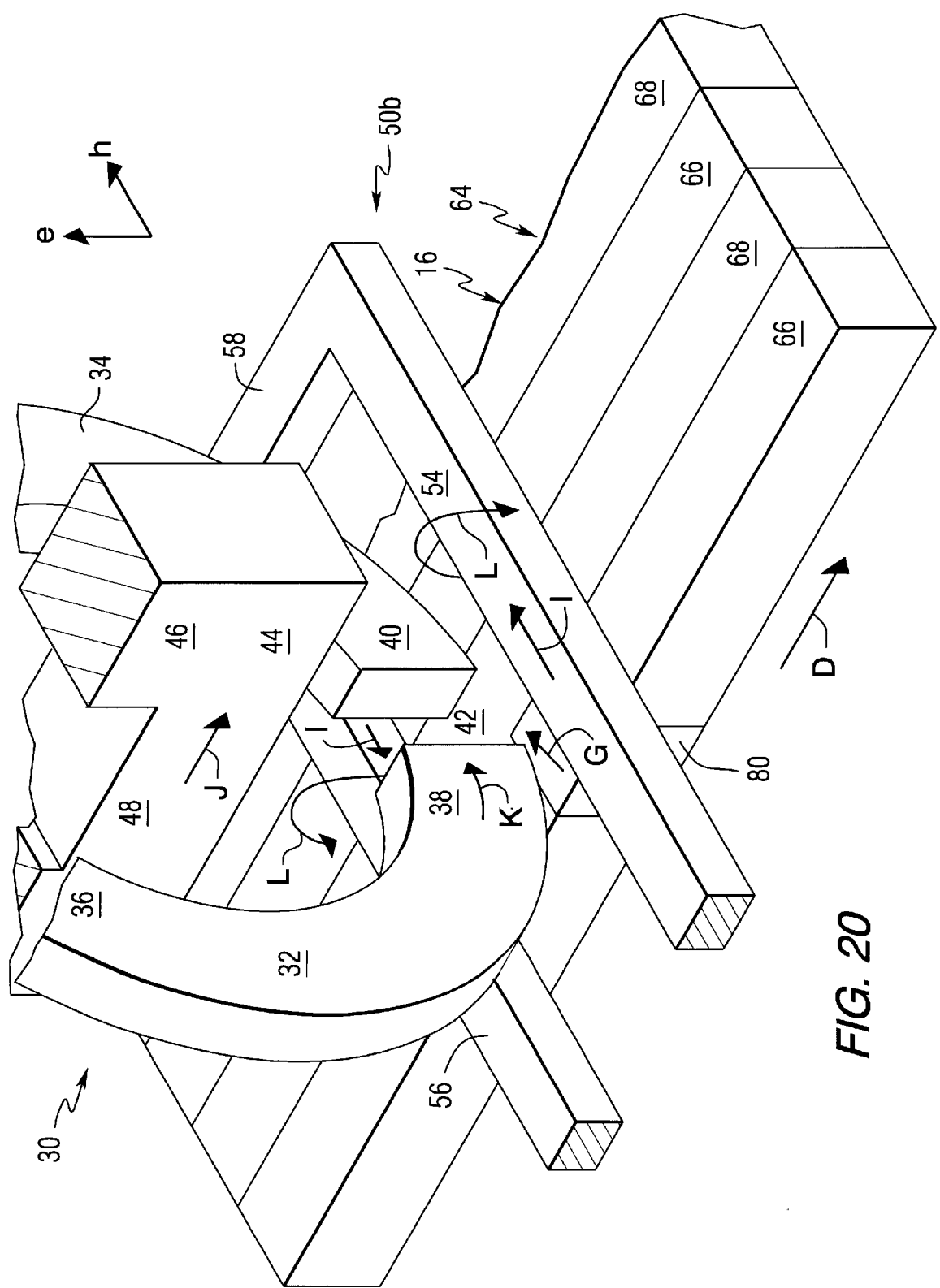
FIG. 20 is a partially schematic, isometric view of the recording head of FIG. 10, illustrating a single magnetic domain to which a non-perpendicular switching field has been applied.
Figure 21:
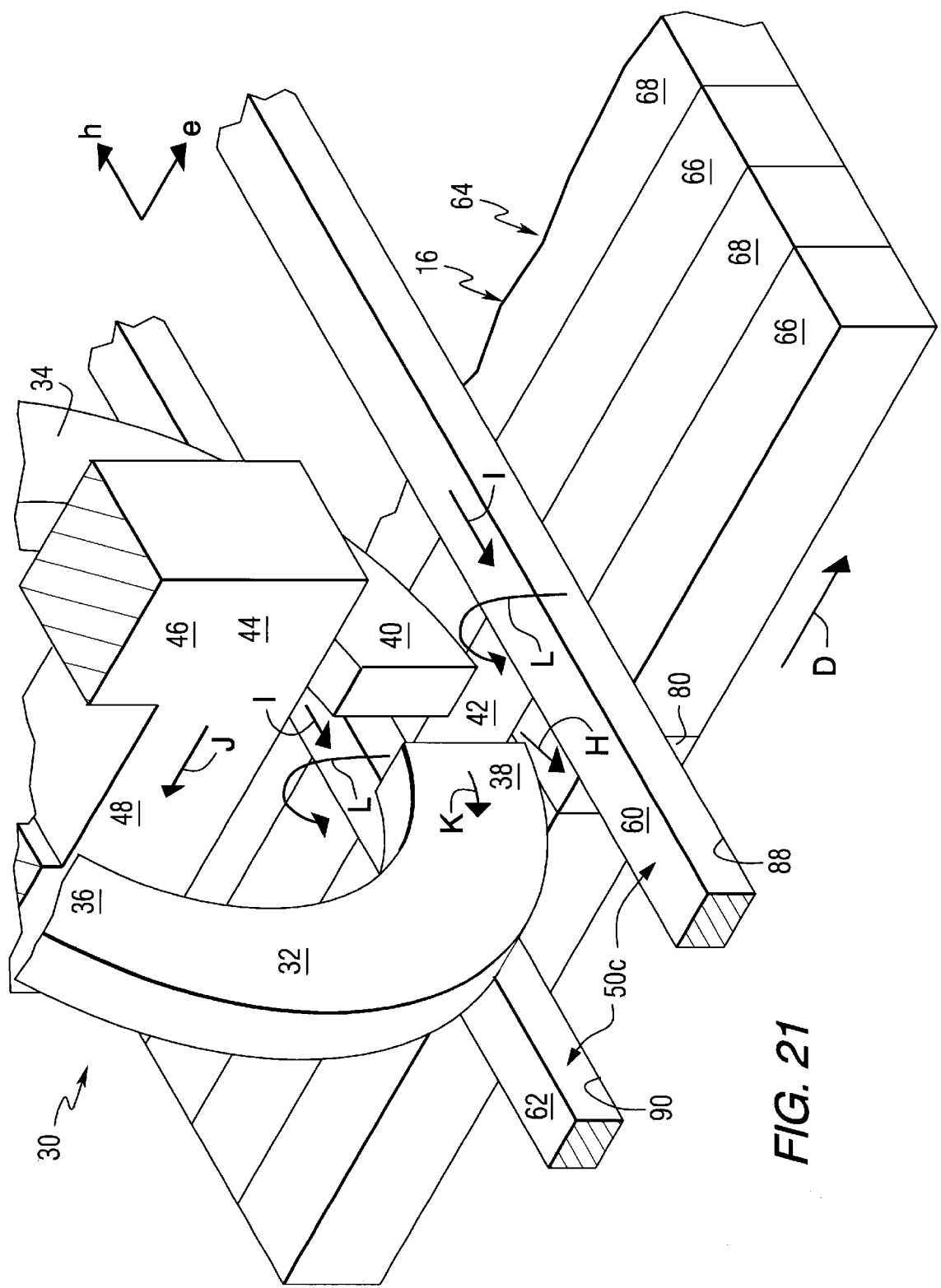
FIG. 21 is a partially schematic, isometric view of the recording head of FIG. 14, illustrating a single magnetic domain to which a non-perpendicular switching field has been applied.

To illustrate the application of a non-perpendicular switching field applied by the recording head 22, FIG. 20 may be substituted for FIG. 12 in the sequence of steps illustrated by FIGS. 11–13. Likewise, FIG. 21 may be substituted for FIG. 16 in the sequence of steps illustrated in FIGS. 15–17. With such A substitutions made, FIG. 20 illustrates a total magnetic field applied to the magnetization G being applied at an angle exceeding 90°. Likewise, FIG. 21 illustrates a total magnetic field applied to the magnetization H being less than 90°. In either case, magnetic oscillations within the underdamped material 66 will be relied on to orient the magnetizations G, H substantially in the desired direction.

While a specific embodiment of the invention has been described in detail, those will appreciate it skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A recording head for use with magnetic storage medium, said recording head comprising:
   a pair of write poles with a connecting yoke therebetween;
   means for applying a magnetic write field substantially perpendicular to an easy axis of the magnetic storage medium, including a first coil for inducing magnetic flux in the write poles;
   a setting coil; and
   means for applying a setting magnetic field from the setting coil to the magnetic storage medium, substantially parallel to the easy axis of the magnetic storage medium.

2. The recording head of claim 1, wherein the write coil is positioned between the write poles.

3. The recording head of claim 1, wherein the setting coil is oriented in a plane parallel to an air bearing surface of the recording head.

4. A recording head for use with magnetic storage medium, said recording head comprising:
   a pair of write poles with a connecting yoke therebetween, each of said write poles having a tip, with a write gap being defined between said tips;
   a first coil adjacent to the write poles, said write poles being dimensioned and configured to apply a magnetic write field substantially perpendicular to an easy axis of the magnetic storage medium when current is passed through the first coil; and
   a setting coil adjacent to said tips of said write poles.

5. The recording head according to claim 4, wherein said write gap has a width corresponding to a trackwidth of the magnetic storage medium.

6. The recording head according to claim 4, wherein said pair of write poles and connecting yoke are fabricated from a single layer of material.

7. The recording head according to claim 4, wherein said setting coil comprises a pair of coils on opposing sides of said tips of said write poles.

8. The recording head according to claim 7, wherein said setting coil further comprises a short connecting said pair of coils.

9. The recording head according to claim 4, wherein said setting coil is located behind said write poles.

10. The recording head according to claim 4, wherein said setting coil is selected from the group consisting of copper, gold, and an asymmetric coplanar strip.

11. A magnetic recording apparatus, comprising:
    a recording head, comprising:
       a pair of write poles with a connecting yoke therebetween, each of said write poles having a tip;
       a first coil adjacent to the write poles; and
       a setting coil adjacent to said tips of said write poles;
    a magnetic storage medium, comprising:
       a plurality of magnetically permeable tracks comprising a plurality of magnetic domains, each of said magnetic domains having an easy axis and a hard axis, said tracks further having a trackwidth;
    said write poles and first coil being dimensioned and configured to apply a magnetic write field substantially perpendicular to said easy axis of said magnetic storage medium when current is passed through the first coil.

12. The magnetic recording apparatus according to claim 11, wherein said write gap has a width corresponding to the trackwidth of the magnetic storage medium.

13. The magnetic recording apparatus according to claim 11, wherein said pair of write poles and connecting yoke are fabricated from a single layer of material.

14. The magnetic recording apparatus according to claim 11, wherein said setting coil comprises a pair of coils on opposing sides of said tips of said write poles.

15. The magnetic recording apparatus according to claim 11, wherein said setting coil further comprises a short connecting said pair of coils.

16. The magnetic recording apparatus according to claim 11, wherein said setting coil is located behind said write poles.

17. The magnetic recording apparatus according to claim 11, wherein said setting coil is selected from the group consisting of copper, gold, and an asymmetric coplanar strip.

18. The magnetic recording apparatus according to claim 4, wherein a hard axis of each of said domains is substantially parallel to said trackwidth.

19. The magnetic recording apparatus according to claim 18, wherein said easy axis is substantially parallel to said track containing said domain, at a location of said domain.

20. The magnetic recording apparatus according to claim 18, wherein said easy axis is substantially perpendicular to both said trackwidth an said track containing said domain, at a location of said domain.

* * * * *

UNITED STATES PATENT AND TRADEMARK OFFICE
CERTIFICATE OF CORRECTION

PATENT NO. : 6,717,770 B1 Page 1 of 1
DATED : April 6, 2004
INVENTOR(S) : Thomas McLendon Crawford It is certified that error appears in the above-identified patent and that said Letters Patent is hereby corrected as shown below:

Column 4,
Line 32, after "is" insert -- a --.

Column 10,
Line 51, "such A substitutions" should read -- such substitutions --.

Column 12,
Line 45, "an" should read -- and --.

Signed and Sealed this

Second Day of May, 2006

JON W. DUDAS
*Director of the United States Patent and Trademark Office*